United States Patent
Xu et al.

(10) Patent No.: US 12,028,129 B2
(45) Date of Patent: Jul. 2, 2024

(54) METHODS AND APPARATUS FOR MULTI-USER EQUIPMENT (UE) COOPERATION

(71) Applicants: Hua Xu, Ottawa (CA); Jianglei Ma, Ottawa (CA)

(72) Inventors: Hua Xu, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 17/347,058

(22) Filed: Jun. 14, 2021

(65) Prior Publication Data
US 2021/0399770 A1    Dec. 23, 2021

Related U.S. Application Data

(60) Provisional application No. 63/040,845, filed on Jun. 18, 2020.

(51) Int. Cl.
*H04B 7/026* (2017.01)
*H04W 8/24* (2009.01)
*H04W 24/08* (2009.01)

(52) U.S. Cl.
CPC ............ *H04B 7/026* (2013.01); *H04W 8/24* (2013.01); *H04W 24/08* (2013.01)

(58) Field of Classification Search
CPC ......... H04B 7/026; H04W 8/24; H04W 24/08
See application file for complete search history.

(56) References Cited

U.S. PATENT DOCUMENTS

| | | | |
|---|---|---|---|
| 2016/0128123 A1 | 5/2016 | Li | |
| 2016/0182212 A1* | 6/2016 | Zarifi | H04W 28/0236 370/336 |
| 2017/0188370 A1 | 6/2017 | Fu et al. | |
| 2018/0176955 A1* | 6/2018 | Salem | H04W 74/0808 |
| 2020/0059986 A1* | 2/2020 | Kim | H04W 4/46 |
| 2020/0336178 A1 | 10/2020 | Ma et al. | |
| 2021/0211169 A1* | 7/2021 | Xue | H04B 7/024 |

FOREIGN PATENT DOCUMENTS

| CN | 103108329 A | 5/2013 |
|---|---|---|
| CN | 104125560 A | 10/2014 |
| CN | 104869596 A | 8/2015 |

* cited by examiner

*Primary Examiner* — Ricky Q Ngo
*Assistant Examiner* — Stephen N Steiner

(57) ABSTRACT

An enhanced User Equipment (UE) is formed by multiple UEs in a wireless communication network to assist one of the multiple UEs with communications, and involves UE cooperation between the multiple UEs. A capability, or at least one capability, of the enhanced UE is an enhanced capability relative to a capability of the UE that the enhanced UE is to assist. Information that is indicative of the (at least one) capability of the enhanced UE is obtained by a network device, and the network device communicates with the enhanced UE after obtaining the information. From a UE side, information indicative of a capability, or at least one capability, associated with the enhanced UE is transmitted, and the UE communicates with the network device after transmitting the information.

28 Claims, 19 Drawing Sheets

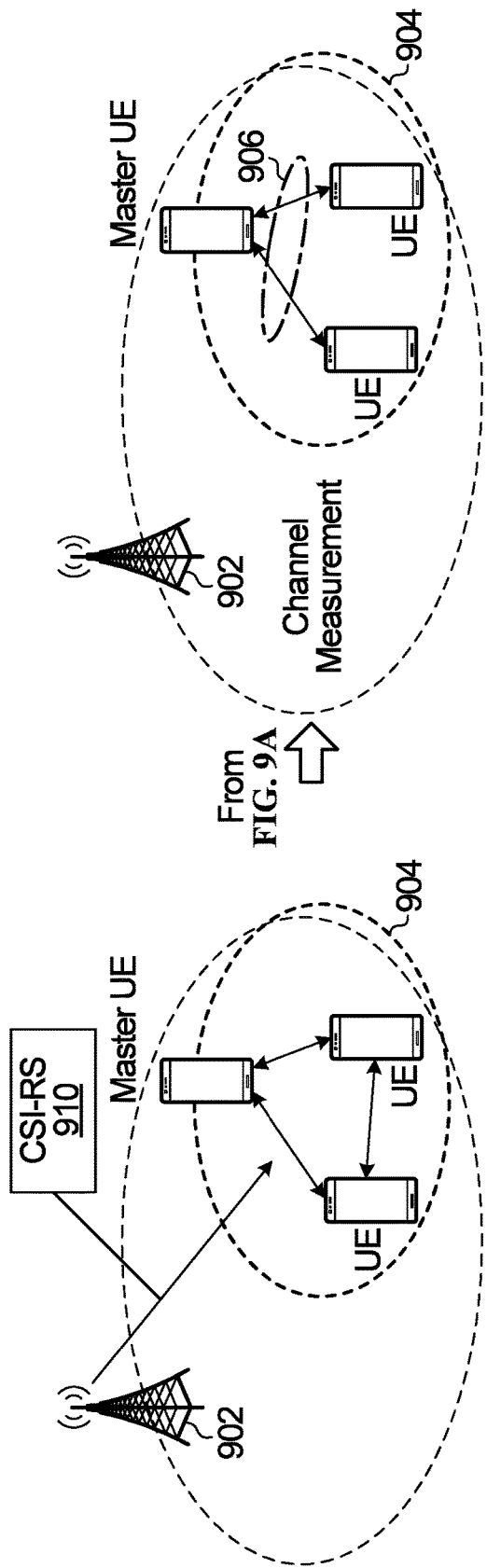
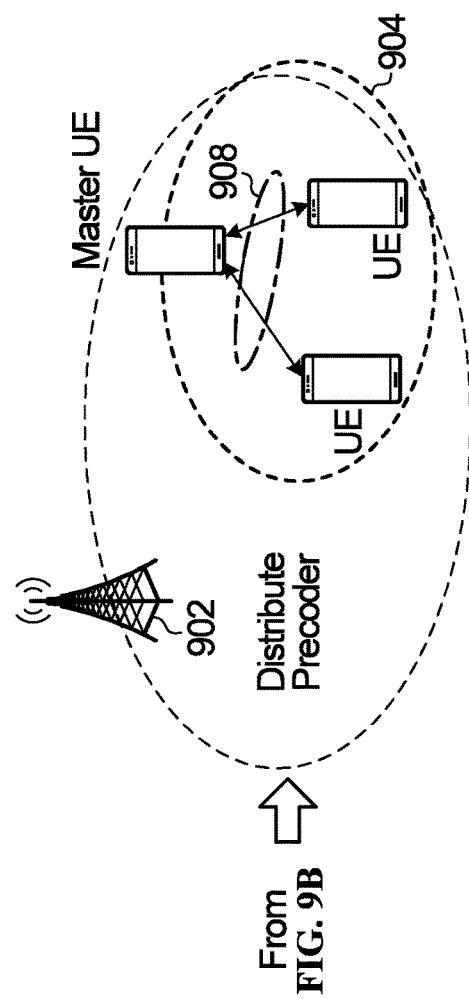
FIG. 9A
FIG. 9B
FIG. 9C

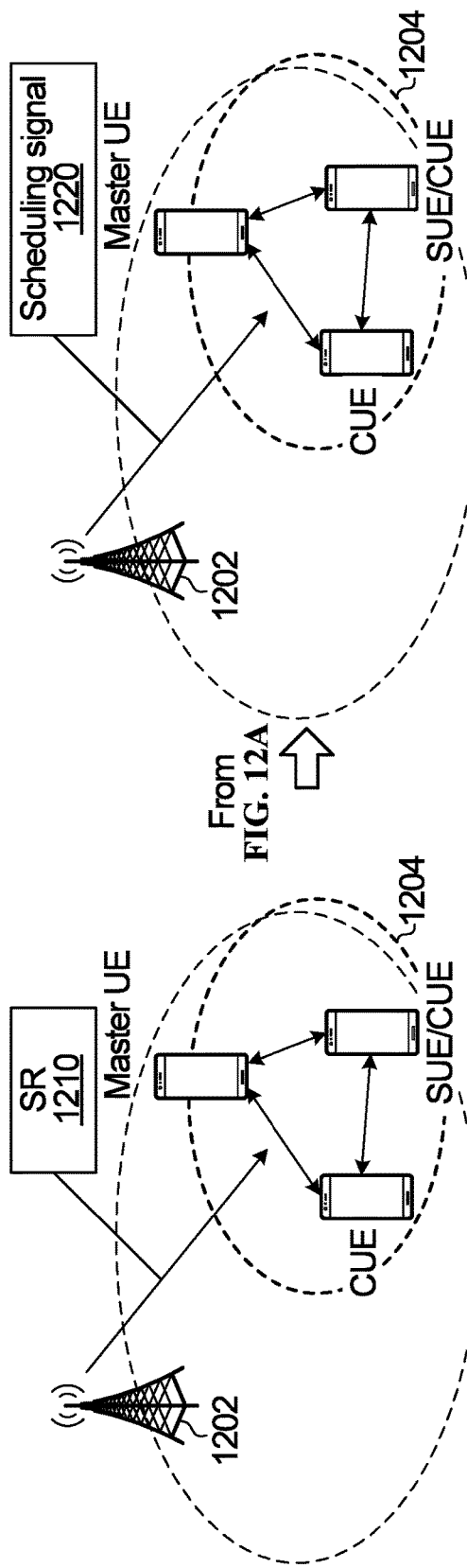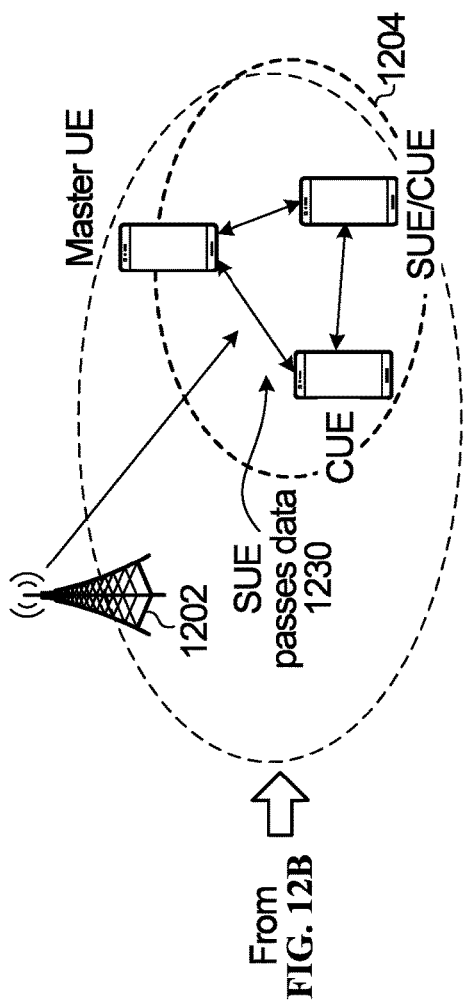
FIG. 12A
FIG. 12B
FIG. 12C

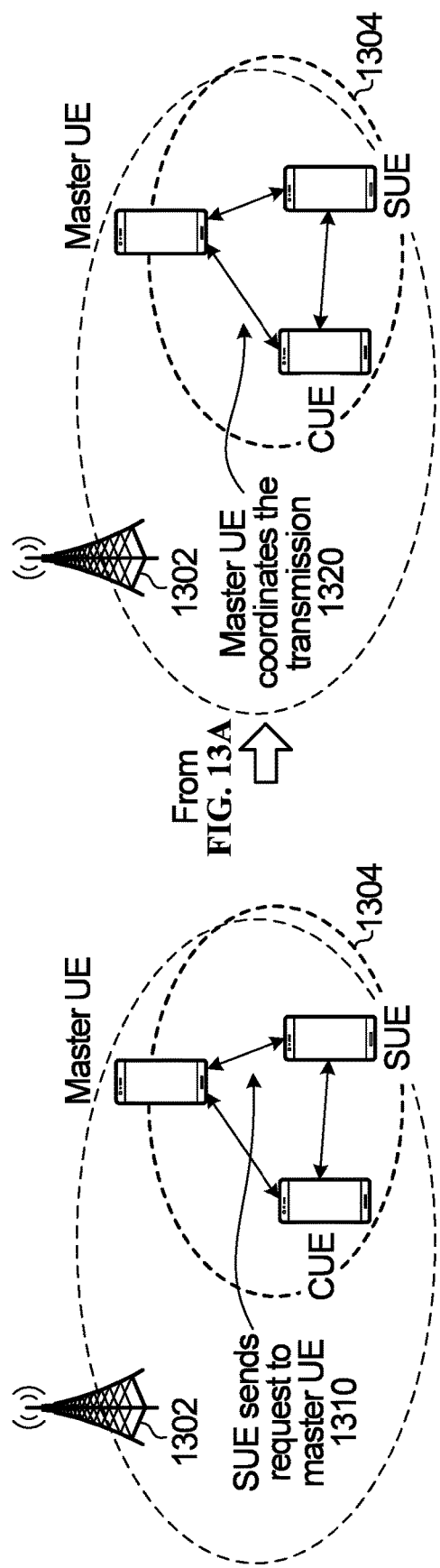
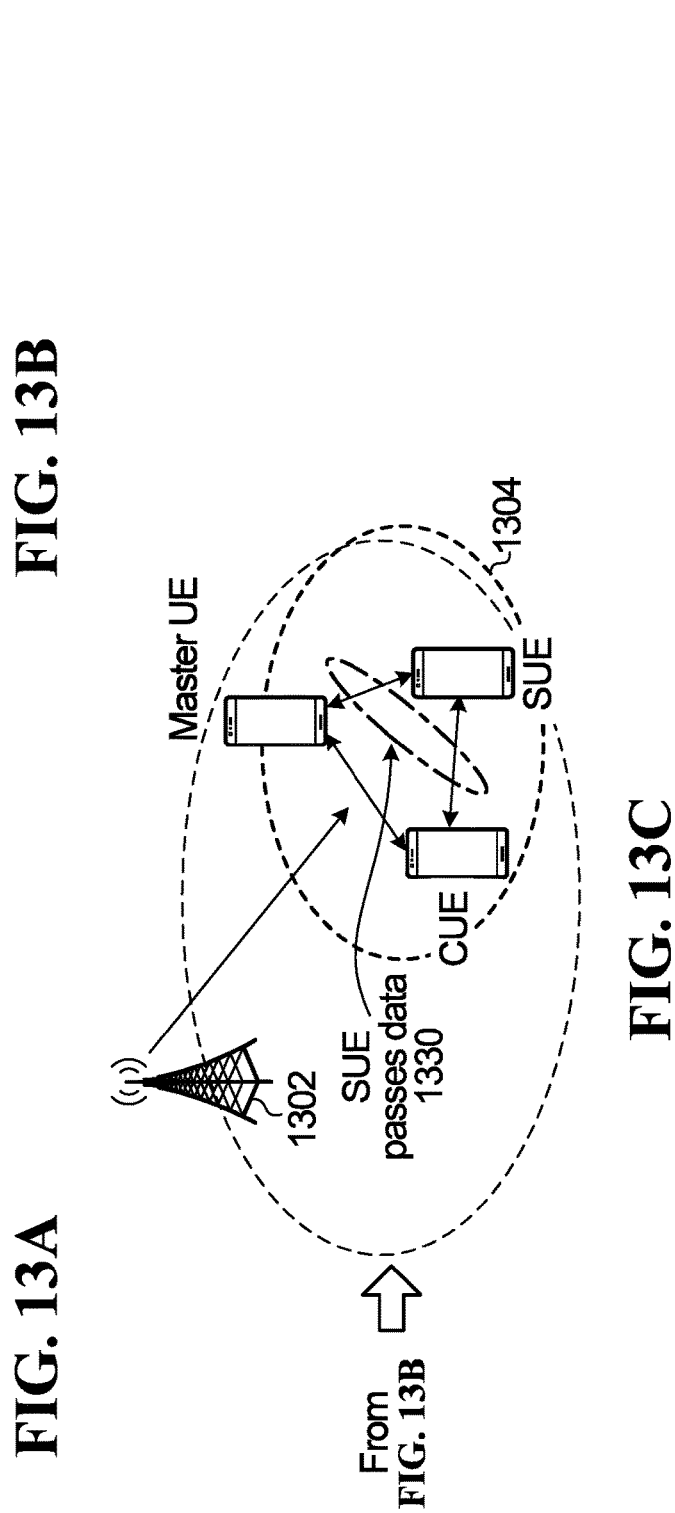
FIG. 13A
FIG. 13B
FIG. 13C

# METHODS AND APPARATUS FOR MULTI-USER EQUIPMENT (UE) COOPERATION

CROSS-REFERENCE TO RELATED APPLICATION

This application is related to and claims the benefit of U.S. Provisional Patent Application No. 63/040,845, filed on Jun. 18, 2020, the entire contents of which are incorporated herein by reference.

FIELD

This application relates generally to communications in a wireless communication network, and in particular to multi-User Equipment (UE) cooperation for UE enhancement.

BACKGROUND

In Long Term Evolution (LTE), Device to Device (D2D) techniques in which UEs communicate directly with each other were studied and specified. Research focus in LTE D2D was primarily on communications between D2D devices. For New Radio (NR) Vehicle to anything (V2X) scenarios, D2D-related research is focused on "Uu link" transmissions between a gNodeB (gNB) and UEs, and on sidelink (SL) transmissions between UEs.

UE cooperation is a communication technique that focuses on cooperative procedures among UEs in a group of UEs, and may be achieved by a group of UEs helping each other with either or both of Uu link communications and sidelink communications. UE cooperation could be useful to, for example, improve such features as any one or more of communication network throughout, coverage, capacity, latency, and reliability, but can introduce challenges in terms of configuring or managing UE cooperation. Scenarios such as V2X, as well as others such as enhanced Mobile Broadband (eMBB) and Ultra-Reliable Low Latency Communication (URLLC), can potentially benefit from UE cooperation.

SUMMARY

According to embodiments disclosed herein, multiple UEs in a cooperation group cooperate with each other to assist one or more of the UEs in the group with communications and thereby enhance operation of the assisted UE(s). The UE cooperation is managed, from a network perspective for example, as a single "logical" UE, which is referred to herein primarily as an enhanced UE but may also or instead be referred to as a virtual UE, an expanded UE, an extended UE, or a super-UE, or by another name.

One aspect of the present disclosure relates to a method performed by a network device in a wireless communication network. The method involves obtaining information that is indicative of a capability (or at least one capability) of an enhanced UE. The enhanced UE is formed by multiple UEs in the wireless communication network to assist a UE of the multiple UEs with communications, and involves cooperation between the multiple UEs. The (at least one) capability of the enhanced UE comprises an enhanced capability relative to a capability of the UE. A method may also involve communicating a signal with the enhanced UE after the obtaining. In such a method, the obtaining enables the network device to communicate with the enhanced UE and take advantage of the (at least one) capability that is enhanced relative to the capability of the UE.

A method performed by a UE in a wireless communication network, according to another aspect of the present disclosure, involves transmitting information indicative of a capability (or at least one capability) associated with an enhanced UE, and communicating a signal with a network device in the wireless communication network after transmitting the information. The enhanced UE is formed by multiple UEs in the wireless communication network, including the UE, to assist an assisted UE of the multiple UEs with communications; involves cooperation between the multiple UEs; and has an enhanced capability relative to a capability of the assisted UE. Such a method enables information that is indicative of the (at least one) capability associated with the enhanced UE to be distributed in the wireless communication network so that the enhanced UE can be formed and used to assist the assisted UE with communications.

According to a further aspect of the present disclosure, a computer program product comprises a non-transitory computer readable storage medium storing programming. The programming includes instructions to perform a method as disclosed herein.

A network device may include a communication interface, a processor coupled to the communication interface, and a non-transitory computer readable storage medium, coupled to the processor, storing programming for execution by the processor. The programming includes instructions to perform a method that involves obtaining information indicative of a capability (or at least one capability) of an enhanced UE, and communicating a signal with the enhanced UE after obtaining the information. The enhanced UE is formed by multiple UEs in the wireless communication network to assist a UE of the multiple UEs with communications, and involves cooperation between the multiple UEs. The (at least one) capability of the enhanced UE comprises an enhanced capability relative to a capability of the UE. Such a network device, by obtaining the information indicative of the (at least one) capability, is able to communicate with the enhanced UE and take advantage of the (at least one) capability that is enhanced relative to the capability of the UE.

A UE may include a communication interface, a processor coupled to the communication interface, and a non-transitory computer readable storage medium, coupled to the processor, storing programming for execution by the processor. The programming includes instructions to perform a method that involves transmitting information indicative of a capability (or at least one capability) associated with an enhanced UE, and communicating a signal with a network device in the wireless communication network after transmitting the information. The enhanced UE is formed by multiple UEs in the wireless communication network, including the UE, to assist an assisted UE of the multiple UEs with communications; involves cooperation between the multiple UEs; and has an enhanced capability relative to a capability of the assisted UE. A UE consistent with this aspect of the present disclosure is able to distribute the information that is indicative of the (at least one) capability in the wireless communication network so that the enhanced UE can be formed and used to assist the assisted UE with communications.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings.

FIGS. 9A to 9C are block diagrams illustrating another example of precoder generation.

FIGS. 12A to 12E are block diagrams illustrating network-scheduled enhanced UE transmission.

FIGS. 13A to 13E are block diagrams illustrating enhanced UE initiation of transmission without network scheduling or grant.

DETAILED DESCRIPTION

Figure 1:
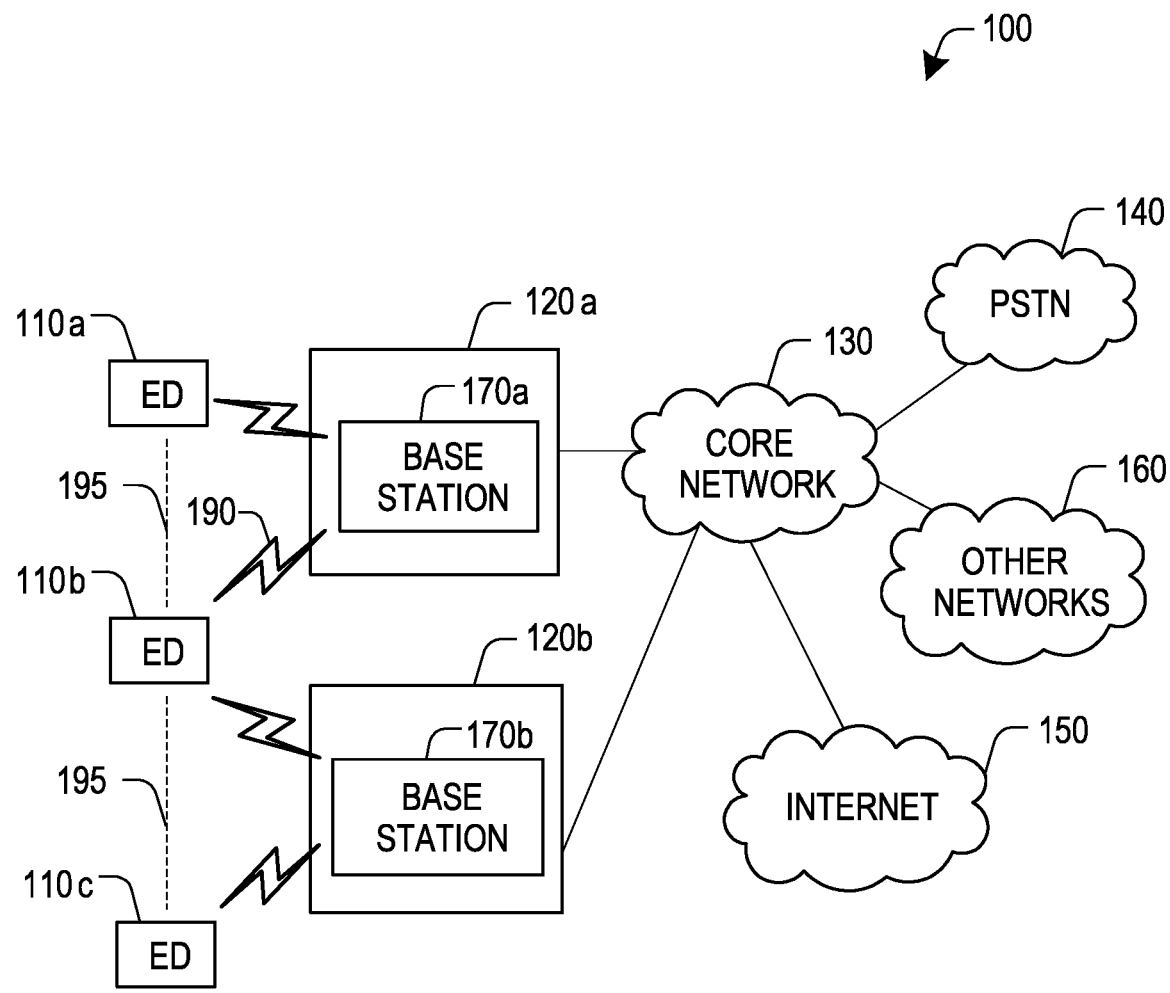
FIG. 1 illustrates an example communication system in which aspects of the present disclosure are implemented in some embodiments.

UE cooperation as disclosed herein may provide a new communication approach in which multiple UEs cooperatively communicate with network devices, and involves coordination among UE(s) in a group in terms of either or both of transmission and reception. For example, a group of nearby UEs could help each other for downlink and/or uplink transmission. In downlink transmission, a network device could transmit data to the UEs in the group, and each UE may then attempt to decode the data. UEs other than a destination UE may relay the data to the destination UE. For uplink communications, a UE with data to transmit to a network device may distribute the data to one or more other UEs via sidelink communications. The UE and the other UE(s) then transmit the data to the network device together.

According to an aspect of the present disclosure, from a network perspective a group of UEs can be viewed as a single enhanced UE, for scheduling downlink and/or uplink transmission or sending feedback for example. This may make the behavior of the group of UEs appear to be more like that of a single UE to a network, and thus reduce the impact on the network. One area of network operation in which treatment of a UE group as a single enhanced UE may be particularly useful is in signaling. For example, an enhanced UE may be scheduled as a single UE for scheduling, thereby simplifying the scheduling and reducing signaling associated with scheduling relative to separately scheduling each UE in a cooperation group.

Various features to support the formation and configuration of an enhanced UE, to facilitate UE cooperation in either or both of downlink (DL) and uplink (UL) communications, are disclosed herein. These include, for example, operations for enhanced UE formation, channel measurement and precoder generation for an enhanced UE, and data transmission for an enhanced UE.

Consider factory and household/office scenarios as an illustrative example. The devices (UEs) in such scenarios tend to be distributed in a substantially static manner, with limited mobility of the UEs and stable relative locations and relationships between the UEs. In such scenarios, more UEs may potentially work together to help with each other's transmissions. Security issues tend to be less of a concern in these scenarios than in some other scenarios, because all UEs in these scenarios typically belong to the same entity. Power consumption also tends to be less of an issue for UEs helping each other in these scenarios, especially for indoor deployments.

To make UEs work better together for UE cooperation, multiple UEs could be bonded, bound, bundled, or otherwise logically coupled together to form an enhanced UE that may, for example, have more antennas than any one of the UEs individually for transmission and/or reception, have more joint transmit power than any one of the UEs individually, or have more processing capability than any one of the UEs individually. Each "helping" UE may lend some or all of its capabilities to form the enhanced UE, while potentially still maintaining its own capabilities when operating alone. Capabilities as referenced herein encompass such features or elements as any one or more of: antennas, transmit power, and processing power, for example. More generally, capability as used herein refers to an ability, of a UE or an enhanced UE, to support or provide a certain feature, function, or operation. For example, an antenna capability of a UE or an enhanced UE indicates support for communications using up to a certain number of antennas. Other examples of capabilities are also provided herein.

Participation in UE cooperation for the purpose of forming or enabling an enhanced UE may be on a voluntary basis. For example, a UE may report its capability or availability to form an enhanced UE, and could opt into or out of being part of an enhanced UE.

The formation of an enhanced UE may be initiated by a UE, such as a UE that has a large amount of data to be transmitted or received. A UE that initiates formation of an enhanced UE can be referred to as a source UE (SUE) for UL or a target UE (TUE) for DL, or more generally as an initiating UE. Formation of an enhanced UE may be completed, for example, by sending a configuration in signaling, to inform a network device and/or UEs about the formation of the enhanced UE. The signaling that carries or otherwise indicates a configuration may be referred to as configuration signaling, and may be high layer signaling in some embodiments, such as RRC signaling. Enhanced UEs may be configured semi-statically in some embodiments, depending on one or more factors or criteria such as the need to boost throughput via UE cooperation and an enhanced UE for example.

The formation of an enhanced UE may also or instead be initiated or determined by a network device. For example, a network device may determine that an enhanced UE should be formed for factory monitoring or smart city applications, and could do so if there is a large amount of data that needs to be transmitted to or from a UE.

An enhanced UE, even though it involves a group or bundle of cooperating UEs, preferably behaves like a single UE at least from a network perspective, to potentially reduce network impact of enhanced UE operation. This makes the individual participating UEs that are involved in the enhanced UE more transparent to the network, and may thus reduce complexity required for network devices to deal with an enhanced UE relative to dealing with each individual participating UE in order to support UE cooperation.

These and other aspects of UE cooperation in the context of an enhanced UE are discussed by way of example in further detail at least below.

FIG. 1 illustrates an example communication system 100 in which aspects of the present disclosure are implemented in some embodiments. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a User Equipment/device (UE), Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, video monitoring camera or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a Base Transceiver Station (BTS), a Node-B (NodeB), an evolved NodeB (eNodeB), a Home eNodeB, a gNodeB or gNB (next generation NodeB, sometimes called a "gigabit" NodeB), a Transmission Point (TP), a Transmission Reception Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, pWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations using the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and direct communication links 195 between UEs are represented by dashed lines in FIG. 1. UEs communicate with each other over sidelinks, for example, to enable UE cooperation in some embodiments.

Figure 2:
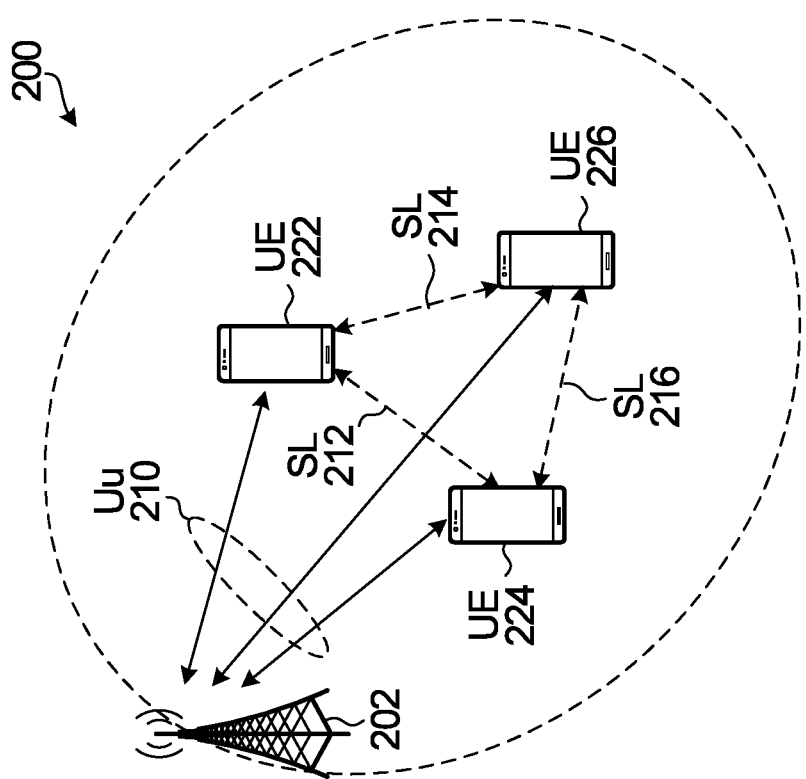
FIG. 2 is a block diagram of another example communication system illustrating UL cooperation according to an embodiment.

FIG. 2 is a block diagram of another example communication system illustrating UL cooperation according to an embodiment. The example system 200 includes network equipment 202, also referred to herein as a network device, and UEs 222, 224, 226. In a cellular network, a UE could connect to a network directly, through a direct communication link such as a so-called "Uu" link or another cellular link, over a Uu air interface for example. The UEs 222, 224, 226 are "in-coverage" (within a geographical area of direct communication with the network equipment 202) in the example shown, and communications between the UEs and the network equipment are through direct communication links shown by way of example as "Uu" links 210 in FIG. 2. Sidelink communications directly between the UEs 222, 224, directly between the UEs 222, 226, and directly between the UEs 224, 226 are through respective sidelinks 212, 214, 216. Examples of these components and implementation options for communications between these components are provided elsewhere herein. Network equipment 202 may be a network device or equipment such as a base station 170a, 170b in FIG. 1 and the UEs may be EDs 110a-c in FIG. 1, for example.

Although the communication system 200 in FIG. 2 is used to illustrate UE cooperation features below, it should be appreciated that the features disclosed herein may be implemented in conjunction with other communication systems having similar or different structures or topologies. FIG. 2 is intended to be a non-limiting and illustrative example.

Figure 3A:
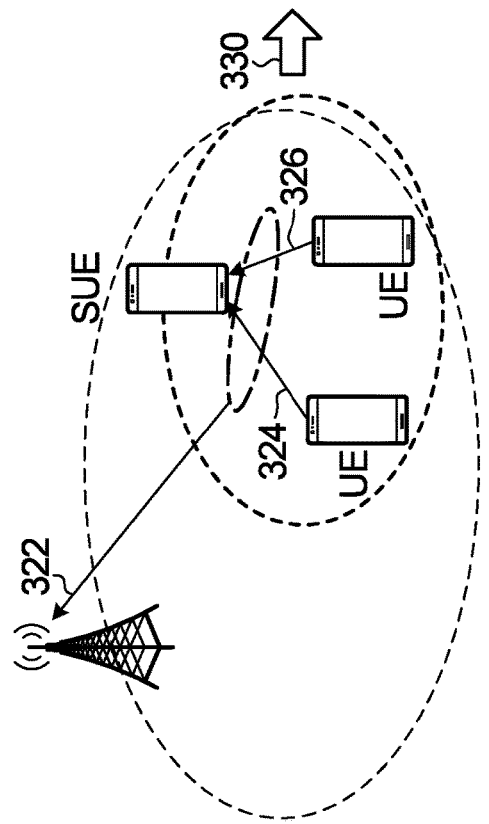
FIGS. 3A to 3C are block diagrams illustrating a technique for forming an enhanced UE according to an embodiment.
Figure 3B:
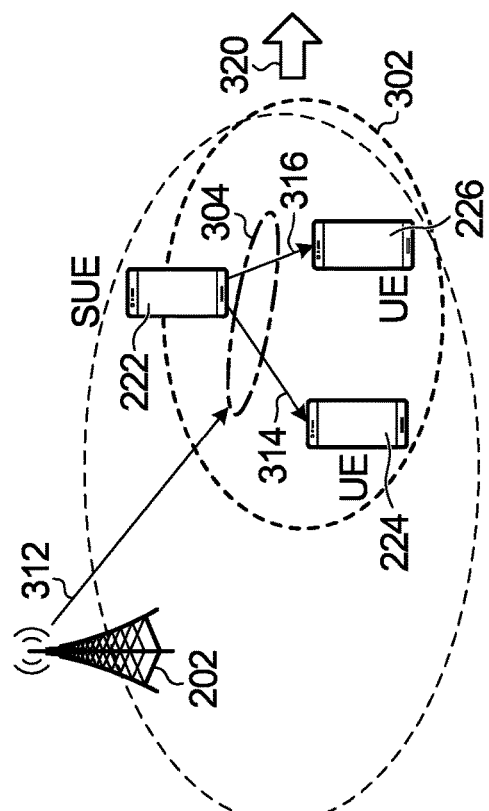
Figure 3C:
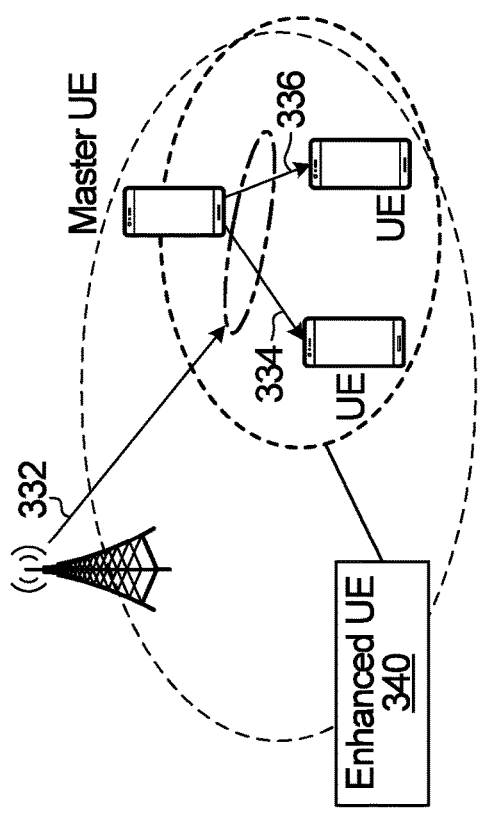

FIGS. 3A to 3C are block diagrams illustrating a technique for forming an enhanced UE according to an embodiment, and include the network equipment 202 and UEs 222, 224, 226 in the example communication system 200 in FIG. 2. Uu links and SLs are not shown in FIGS. 3A to 3C in order to avoid further congestion in the drawings. In FIG. 3A, 302 designates a group of UEs that are nearby each other and in connected mode within network coverage, and 304 generally represents one or more interfaces for communications with, and between, the UEs in the group.

In some embodiments, formation of an enhanced UE is initiated or triggered by a UE. For example, in FIG. 3A the UE 222 is labelled as an SUE and has a large amount of data to be transmitted in UL or received in DL. Although a destination UE to which data is to be transmitted in DL may be referred to as a TUE, the label "SUE" is used for the UE 222 in FIGS. 3A and 3B in order to avoid further congestion in the drawings.

Formation of an enhanced UE could also or instead be initiated or triggered by a network device 202, such as a gNB. For example, the network device 202 may determine, based on data that the network device itself has to transmit to the UE 222, based on scheduling requests or other signaling received from the UE 222, or on some other basis, that a large amount of data is to be transmitted to the UE and/or that the UE has a large amount of data to transmit to the network device.

Signaling from the UE 222 to initiate formation of an enhanced UE is shown by way of example in FIG. 3A at 314, 316. The UE 222 may also or instead transmit signaling to the network device 202 to initiate formation of an enhanced UE. For network-initiated enhanced UE formation, the network device may transmit signaling to any one or more UEs, as shown generally at 312 in FIG. 3A. The network device 202 may transmit such signaling only to the SUE 222 that is to be assisted, only to candidate UEs 224, 226 that may be available to lend capabilities to or share capabilities with an enhanced UE, or to the SUE 222 and the UEs 224, 226, for example.

After an initiation or triggering phase, enhanced UE formation may transition or otherwise progress, at 320, to UE capability reporting. In an embodiment, the network device 202 requests nearby UEs 224, 226, and possibly 222 as well, to report their respective capabilities for forming an enhanced UE. UE capability may include one or more parameters, properties, features, or configurations, such as any one or more of the following illustrative examples: number of antennas, multiple-input multiple-output (MIMO) capability, and SL protocol or capability. SL protocol or capability may include, for example, any one or more of: Bluetooth™, WiFi, NR SL, and bandwidth support.

The capability of a UE as reported for the purpose of forming an enhanced UE may be different from then normal capability of the UE when the UE operates on its own. For example, a UE could report 4 antennas in its normal UE capability assuming that the UE operates by itself, while the same UE may report 2 antennas as its capability for the enhanced UE when the UE will be helping one or more other UEs. Thus, a UE may lend or contribute only some of its capabilities to an enhanced UE.

UE capability for the purpose of forming an enhanced UE need not necessarily be uniform or fixed. For example, a UE capability need not be made available to an enhanced UE for both DL and UL communications, and could instead be shared with an enhanced UE for DL only or for UL only. Similarly, UE capability may vary with other parameters, and could be different for enhanced UEs that are to be formed to assist different SUEs for example.

Another possible option that may also or instead be supported involves the UE that initiates the enhanced UE requesting or soliciting one or more nearby UEs in connected mode to report their respective capabilities in order to form the enhanced UE.

A capability report for forming an enhanced UE may be transmitted to the network device 202 directly, or to the UE initiating the enhanced UE. A capability report that is transmitted to the initiating UE may also be conveyed to the network device 202. Capability reporting to the network device 202 is shown in FIG. 3B at 322. Such reporting at 322 may involve signaling that is indicative of one or more UE capabilities, and is transmitted directly to the network device 202 or indirectly to the network device through the initiating UE such as the SUE 222 in FIG. 3B. Capability reporting may also or instead involve signaling, from a candidate UE such as 224, 226 to an initiating UE 222, as shown at 324, 326.

Thus, in general, capability signaling that is indicative of UE capability for the purpose of an enhanced UE may be transmitted by a UE to a network device such as the network device 202 or to an initiating UE such as the UE 222. Either a network device such as the network device 202 or an initiating UE such as the UE 222 may request or solicit capability reporting. Capability signaling need not necessarily be transmitted by a UE only to an entity from which a request is received. For example, a UE may transmit capability signaling to a network device in response to receiving capability report request signaling from another UE, or a UE may transmit capability signaling to another UE in response to receiving capability report request signaling from a network device.

A candidate or component UE such as the UEs 224, 226 need not necessarily be a normal UE with the same or similar functionality as other UEs, and may instead be simplified devices that have some wireless communication functions. For example, the UEs 224, 226 could be or include remote antennas, remote radio heads (transceivers), remote transmit/receive points, etc., with short range communication capability Such devices may still be used to form an enhanced UE with one or more normal UEs, but leave certain functions or features such as most baseband processing to be done by the normal UE(s).

The arrow at 330 represents a transition or progression to a further stage or phase of enhanced UE formation, in which a determination is made as to whether an enhanced UE can be or should be formed. This determination may be made by a network device such as the network device 202, or by an initiating UE such as the UE 222 which may then transmit signaling to inform the network device that the enhanced UE is to be formed and configured. Such a determination may be made based on UE capability reporting, for example.

Any of various criteria may be used to determine whether an enhanced UE is to be formed. Formation of an enhanced UE might be dependent upon one or more of: at least a certain number of UEs being available to share a capability; and at least a certain amount of added capability being available for forming an enhanced UE, such as at least a certain number of additional antennas. One or more other criteria may also or instead be used.

In the event of a positive determination, an enhanced UE is formed and configured. In the example as described with reference to FIGS. 3A-3C, the UEs 222, 224 and 226 could form an enhanced UE 340. Information related to an enhanced UE, also referred to generally herein as a configuration for an enhanced UE, may include any of various types of information.

For example, the configuration of an enhanced UE may include an identification of the enhanced UE, such as a Radio Network Temporary Identifier (RNTI). An enhanced UE ID could be an SUE/TUE ID if there is only one SUE/TUE in the enhanced UE. Another example of an enhanced UE ID is a master UE ID. An enhanced UE ID could instead be a new ID that is not associated with any component UE ID in the enhanced UE.

An enhanced UE configuration may include one or more component UE IDs. The component UE ID that is used for a component UE that is participating in an enhanced UE could, but need not necessarily, be an RNTI or other identifier that is used in normal operation of the component UE on its own. The component UE ID may be a relative ID within the enhanced UE. For example, three component UEs in an enhanced UE may be assigned component UE IDs of "001", "0107011", respectively, and those component UE IDs may be part of an enhanced UE configuration.

MIMO capability and number of antennas of each component UE contributed to the enhanced UE are examples of information that may also or instead be part of an enhanced UE configuration. The number of antennas that a component UE contributes to the enhanced UE may be fewer than its normal antenna configuration when the component UE is operated by itself, or in other words when it is not operated as part of an enhanced UE.

Either or both of Sounding Reference Signal (SRS) information and Demodulation Reference Signal (DMRS) information, such as SRS and DMRS ports and signals, may be included in an enhanced UE configuration.

The role of each component UE in terms of coordination or functions may be specified in an enhanced UE configuration in some embodiments. As shown in FIG. 3C, within the enhanced UE 340, one UE may be configured as a master UE, and the rest of the component UEs are configured as normal UEs within the enhanced UE. In the example shown, the UE 222 is the master UE and the other UEs 224, 226 are normal UEs. The master UE may, but need not necessarily, be the UE that initiates the enhanced UE or the SUE/TUE if there is only one SUE/TUE as in the example shown. Although an enhanced UE may potentially have multiple SUEs/TUEs, there is preferably only one master UE.

A configuration for an enhanced UE may also or instead include information specifying the role of each component UE in terms of data initiation (source) or destination. One or more UEs may be an SUE (for UL) or a TUE (for DL), and any other UE(s) may be cooperative UEs (CUEs).

Data processing and data sharing within an enhanced UE is specified in a configuration in some embodiments. This may include, for example, an SL configuration for communication among component UEs, and/or a data processing configuration that specifies such properties or parameters as any one or more of: channel coding, modulation, and MIMO layer generation. As an example, a data processing configuration may include information indicating the UE(s) in which each processing function is to be performed and/or on which UE(s) data is to be multiplexed.

An enhanced UE may be configured for DL only, UL only, SL only, or any combination of two or more of DL, UL, and SL.

In order to configure an enhanced UE, an enhanced UE configuration may be sent by a network device to each component UE directly, if the network device itself determines that an enhanced UE is to be formed for example. Alternatively, the enhanced UE configuration may be sent by a network device to one or more UEs, such as only to a UE that initiated an enhanced UE, only a master UE, or to all component UEs. Transmission of signaling indicative of an enhanced UE configuration by the network device 202 is shown at 332 in FIG. 3C.

An initiating UE or master UE that receives an enhanced UE configuration from a network device may share the enhanced UE configuration with other component UEs of the enhanced UE via signaling over SL. In some embodiments, if it is a UE that initiates the enhanced UE and/or makes the determination on enhanced UE formation for example, the enhanced UE configuration may be sent by that UE directly to each component UEs via SL, and at the same time send signaling to a network device to inform the network device of the determination and/or at least some configuration information so that the network device can then communicate with the enhanced UE as a single UE. Transmission of signaling indicative of an enhanced UE configuration by the master UE is shown at 334, 336 in FIG. 3C.

Figure 4:
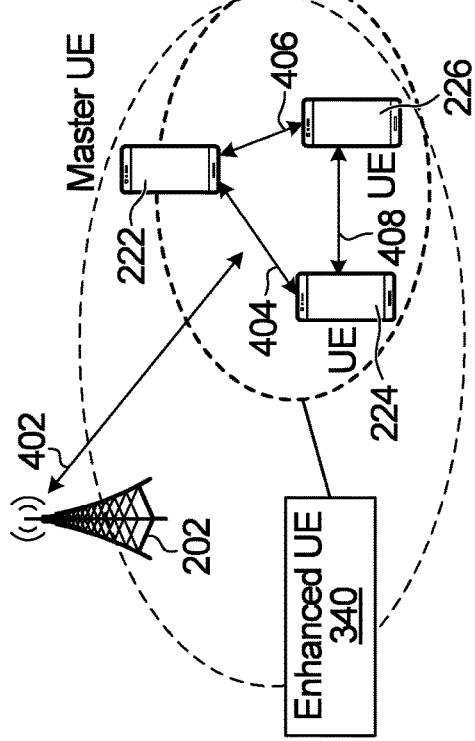
FIG. 4 is a block diagram illustrating an example of communications between a network device and an enhanced UE, and between component UEs of an enhanced UE.

Regarding operation of an enhanced UE, FIG. 4 is a block diagram illustrating an example of communications between the network device 202 and the enhanced UE 340, and between the component UEs 222, 224, 226 of the enhanced UE. Communications between the network device 202 and the enhanced UE 340 are shown at 402 and may be over one or more Uu links for example, and communications between the component UEs 222, 224, 226 are shown at 404, 406, 408 and may be over respective sidelinks for example.

Component UEs of an enhanced UE may have different roles in terms of handling data. A component UE may operate as a data initiation source (SUE for UL) or destination (TUE for DL), or a CUE. An SUE is a UE from which transmitted data is originated. A data transmission may be an original transmission or a re-transmission of data. A TUE is a UE that is a final destination of data (original transmission or re-transmission) from a network device or another UE. A CUE is a UE that receives UL data from one or more SUE(s) and transmits that UL data toward a network device, receives DL data from a network device and transmits that DL data toward one or more TUE(s), and/or receives data from one or more SUE(s) and transmits that data toward one or more TUE(s). A CUE may handle only UL data, only DL data, only SL data, or any combination of two or more of UL data, DL data, and SL data.

An enhanced UE may have one SUE/TUE, or may have multiple SUE(s)/TUE(s). In some embodiments, a UE could be an SUE/TUE and a CUE at the same time. For example, a UE may have its own data for transmission and at the same time be helping one or more other UE(s).

Figure 5B:
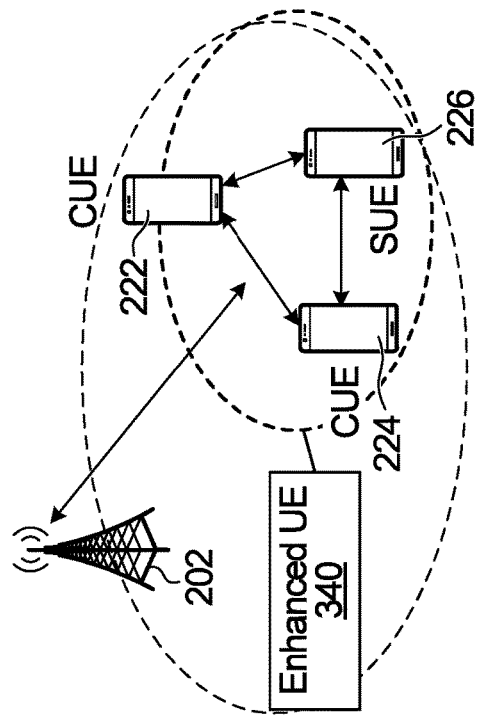
FIGS. 5A and 5B are block diagrams illustrating an example of how roles of component UEs in an enhanced UE may change.
Figure 5A:
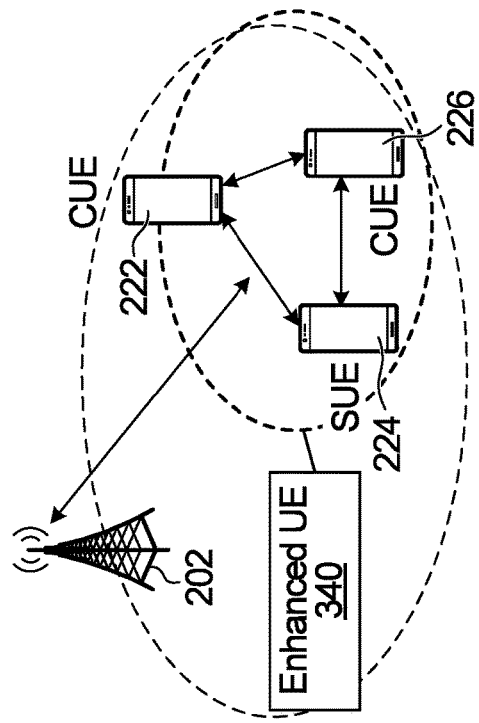

Roles of SUE/TUE and CUE may change, on a per transmission basis for example. FIGS. 5A and 5B are block diagrams illustrating an example of how roles of component UEs 222, 224, 226 in an enhanced UE 340 may change. The UE 224 is an SUE and UEs 222, 226 are CUEs for one transmission as shown in FIG. 5A, while the UE 226 is an SUE and the UEs 222, 224 are CUEs for another transmission as shown in FIG. 5B.

In some embodiments, roles of component UEs as SUE/TUE and CUE may be configured on a semi-static basis by higher layer signaling. Such higher layer signaling may be communicated between the network device 202 and one or more of the component UEs 222, 224, 226 of the enhanced UE 340, such as only the master UE or all component UEs. Internal reconfiguration of an enhanced UE could be transparent to the network in some embodiments, and handled by the component UEs 222, 224, 226. In general, higher layer signaling may be communicated with at least the component UEs 222, 224, 226 to change roles, from those shown in FIG. 5A to those shown in FIG. 5B for example.

Figure 6:
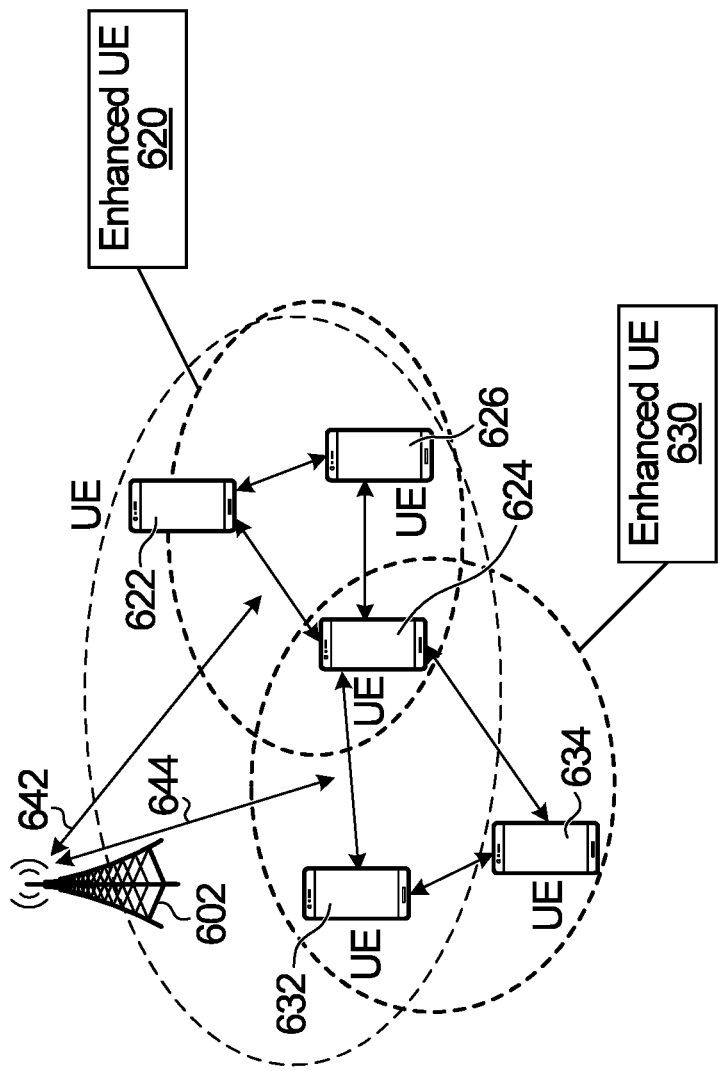
FIG. 6 is a block diagram illustrating an example of communications in a communication system in which one UE is a component UE in multiple enhanced UEs.

A UE could be configured as a component UE for more than one enhanced UE at the same time. In such embodiments, a UE may be a component UE in multiple enhanced UEs at the same time. FIG. 6 is a block diagram illustrating an example of communications in a communication system in which one UE is a component UE in multiple enhanced UEs. In the example shown, the network device 602 communicates with multiple enhanced UEs 620, 630. The UEs 622, 624, 626 are component UEs of the enhanced UE 620, and the UEs 632, 634, 624 are component UEs of the enhanced UE 630. The UE 624 is a component UE of each of the enhanced UEs 620, 630. Communications between the network device 602 and the enhanced UEs 620, 630 are shown at 642, 644 and may be over one or more Uu links for example, and communications between the component UEs of each enhanced UE are shown as double-ended arrows within each enhanced UE and may be over respective sidelinks for example.

Although two enhanced UEs 620, 630 are shown in FIG. 6, all of the UEs could be configured as component UEs in a single enhanced UE. A single enhanced UE example in the context of the UEs shown in FIG. 6 illustrates a possible variation in which an enhanced UE includes multi-hop links between at least some component UEs. Suppose, for example, that the UE 632 is an SUE in an enhanced UE that includes all of the UEs shown in FIG. 6. Communications between the SUE 632 and the component UEs 622, 626 in this example are via multi-hop links through the UE 624.

Figure 7:
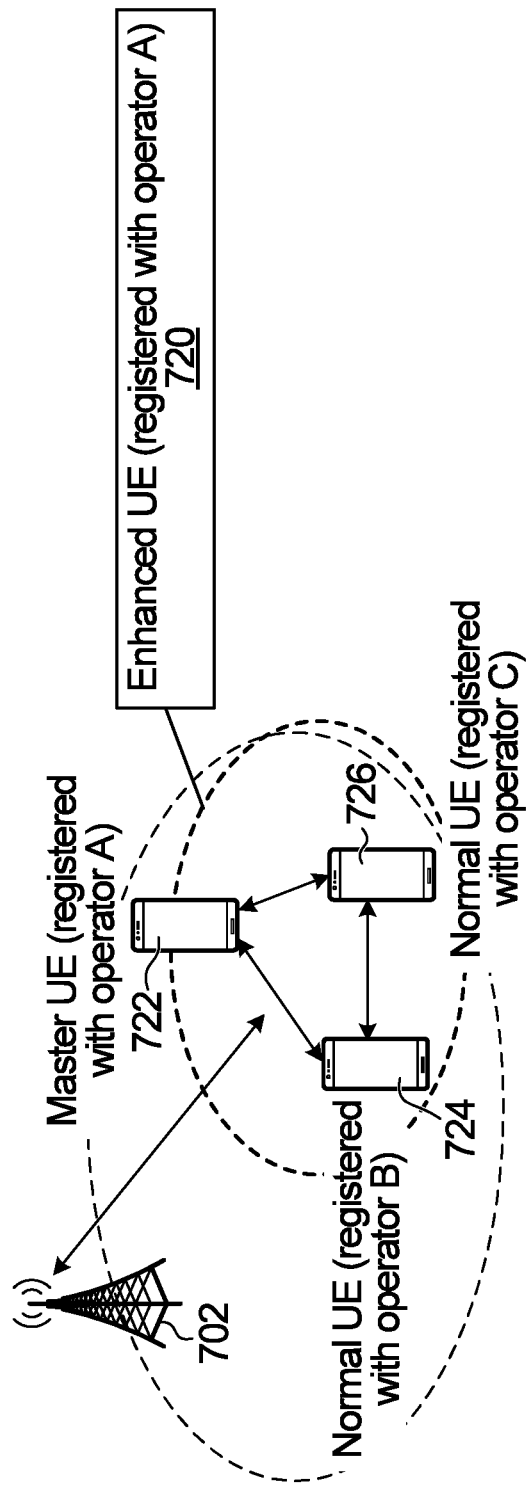
FIG. 7 illustrates another embodiment in which an enhanced UE and its component UEs may be registered or otherwise operate with different network operators.

FIG. 7 illustrates another embodiment in which an enhanced UE and its component UEs may be registered or otherwise operate with different network operators. As shown by way of example in FIG. 7, an enhanced UE 720 may be register or operate with a network operator A of the network device 702, while its component UEs 722, 724, 726 could register or operate with operators A, B, and C, respectively. At least one of the component UEs, the master UE 722 in the example shown, is registered with or operates with operator A. The component UE(s) 724, 726 that are not registered with or operating with operator A, may still access the network of operator A, via the component UE 722 that has access to the network operator A, or the enhanced UE 720 that is also registered with or operating with that network, and behave transparently to the operator A under the enhanced UE.

In general, one or more of the component UEs in an enhanced UE might not have accessibility to the network of a particular operator, but may operate at least as simplified devices such as remote antennas or remote transceivers of an enhanced UE. Such component UEs can still help one or more other UEs in an enhanced UE by providing additional capability, such as more antennas, more transmit/receive points, or more processing power for example.

A multi-operator embodiment facilitates cooperation among UEs that are registered with or operate with different network operators and allows UEs to work together as an enhanced UE for a different operator. This may make UE cooperation more flexible and more viable for implementation in any of various deployment scenarios. Multi-operator embodiments may be more suited to UE-initiated enhanced UEs, to avoid network-side coordination for the purpose of forming and configuring an enhanced UE including component UEs that are registered with or operate with different network operators.

The example features and procedures outlined above relate to forming and configuring enhanced UEs and enhanced UE configurations, to facilitate enhanced UE formation and usage through UE cooperation but with reduced impact to a communication network.

Channel measurement, precoding generation, and joint precoding operation for enhanced UEs are also disclosed herein, at least below.

Figure 8A:
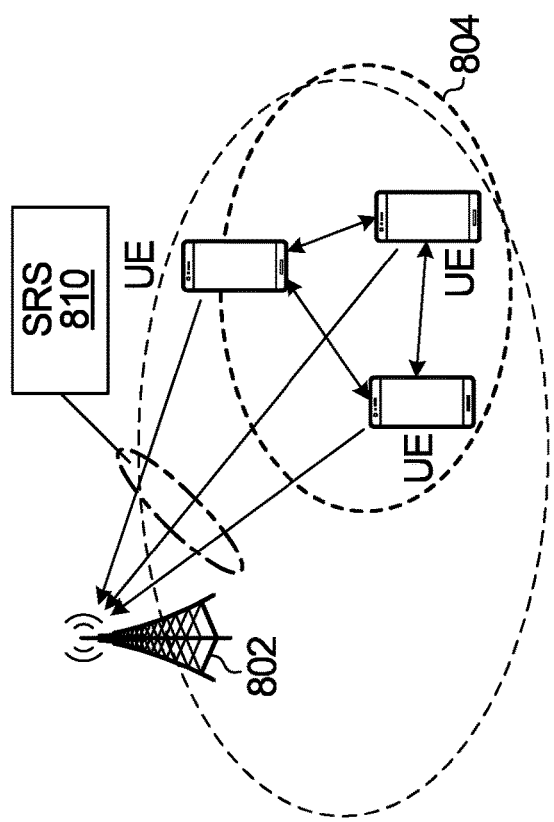
FIGS. 8A and 8B are block diagrams illustrating an example precoder generation technique according to an embodiment.
Figure 8B:
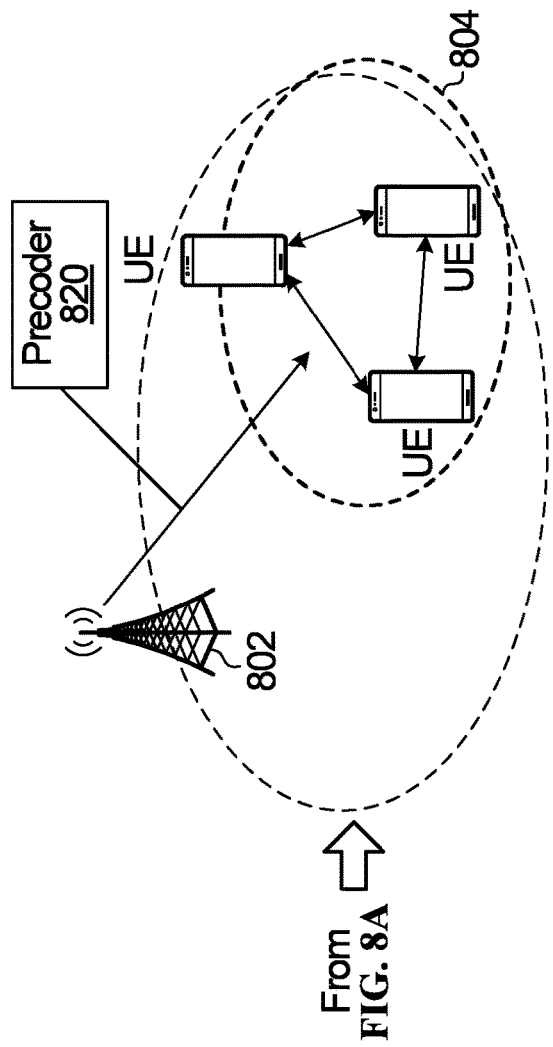

Regarding channel measurement and precoding generation for an enhanced UE, FIGS. 8A and 8B are block diagrams illustrating an example precoder generation technique. In the illustrated embodiment, the enhanced UE 804 (i.e., all of its configured component UEs) transmit SRS signaling 810 to a network device 802 as shown in FIG. 8A, and the network device measures the UL channel conditions, generates a precoder such as a joint precoding vector for the enhanced UE, and feeds the precoder 820 back to the enhanced UE as shown in FIG. 8B.

The SRS signaling 810 may include SRS sequences generated based on an enhanced UE ID and/or other configured parameters, for example.

In an embodiment, the SRS signaling 810 is transmitted from enhanced UE antenna ports configured for each component UE. The beams used by each component UE for transmission of SRS signaling 810 may be the same or different. For example, different beams may be derived from an ID or another parameter or information associated each component UE when it is operated as individual UE in connected mode.

A precoder 820 such as one or more joint precoding vectors may be received by all component UEs in the enhanced UE 804 from the network device 802 or received by a master UE in the enhanced UE first and then distributed to the other component UE(s).

FIGS. 9A to 9C are block diagrams illustrating another example of precoder generation, by an enhanced UE. If channel reciprocity exists as in the case of a Time Division Duplex (TDD) system for example, then a network device 902 could transmit Channel State Information-Reference Signal (CSI-RS) signaling 910 in DL, and the enhanced UE 904 measures the channel as shown in FIG. 9B and derives a joint precoder such as a joint precoding vector. In some embodiments, one UE (e.g., a master UE) receives signaling indicative of the channel measured by each other component UE in the enhanced UE and the master UE derives the joint precoder based on the channel measurements. This is shown at 906 in FIG. 9B. The joint precoder, such as one or more joint precoding vectors, is distributed to each other component UE as shown at 908 in FIG. 9C.

Figure 10:
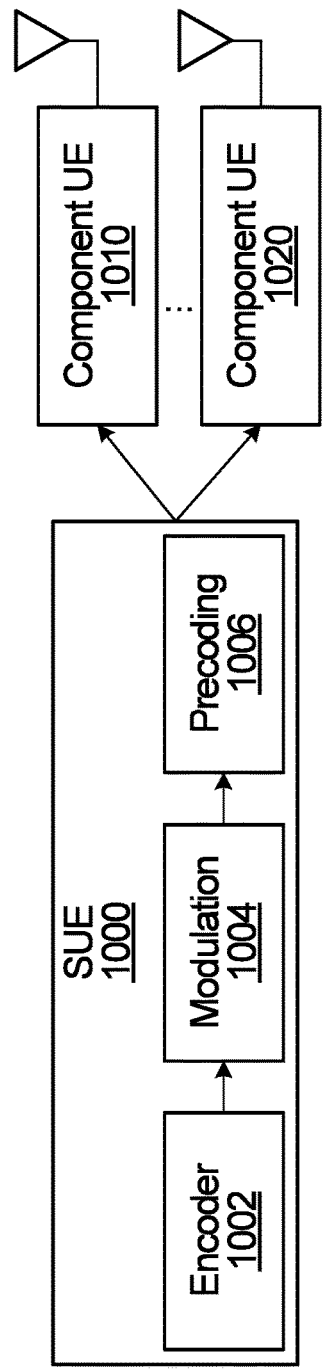
FIG. 10 is a block diagram illustrating an example of an enhanced UE in which precoding is performed at a source UE.

One or more joint precoding operations for an enhanced UE may be applied in any of various ways. FIG. 10 is a block diagram illustrating an example of an enhanced UE in which precoding is performed or applied at a source UE. The SUE 1000 in this example includes an encoder 1002 to encode data, a modulation module or element 1004 such as a modulator coupled to the encoder to modulate encoded data, and a precoding module or element 1006 coupled to the modulation module to precode modulated data. In FIG. 10, joint precoding is applied or performed by the SUE 1000, on modulated symbols in the example shown. The SUE 1000 then passes the jointly precoded symbols to the component UEs 1010, 1020 of the enhanced UE, which actually transmit the jointly precoded symbols. In this case, a joint precoding vector or other precoding information may be known by the SUE 1000 but not necessarily distributed to or otherwise known by the component UEs 1010, 1020.

Figure 11:
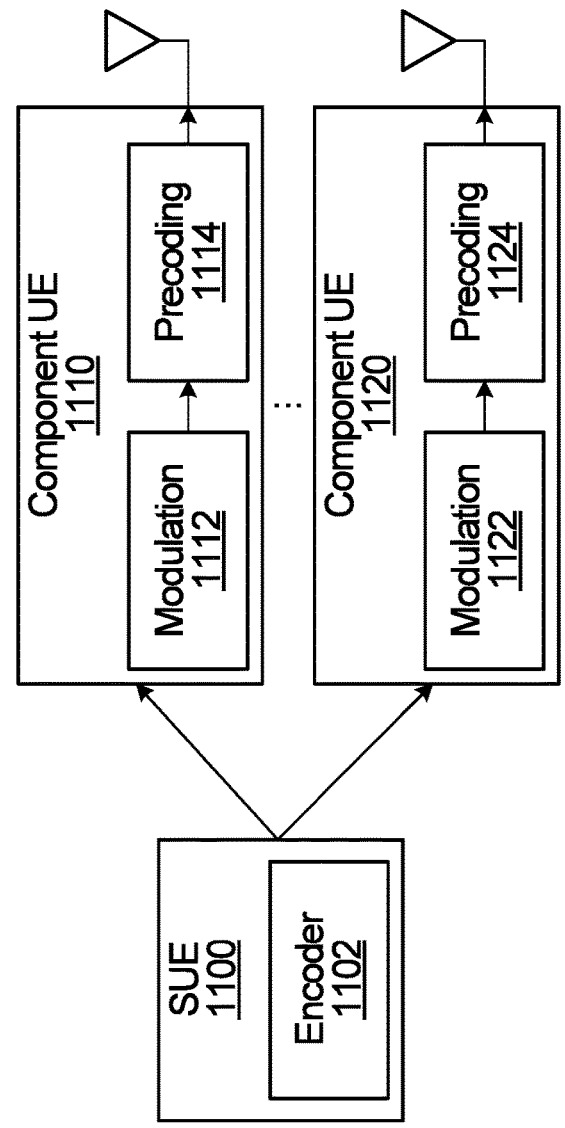
FIG. 11 is a block diagram illustrating an example of an enhanced UE in which precoding is performed at cooperating UEs.

FIG. 11 is a block diagram illustrating an example of an enhanced UE in which precoding is performed at each component UE of the enhanced UE. In this example, the SUE 1100 includes an encoder 1102 to encode data, and each component UE 1110, 1120 of the enhanced UE includes a modulation module or element 1112, 1122 such as a modulator to receive encoded data and modulate the encoded data, and a precoding module or element 1114, 1124 coupled to the modulation module to precode modulated data. Joint precoding in this example is applied at each component UE 1110, 1120 of enhanced UE. The SUE 1100 may pass encoded data to the component UEs 1110, 1120, and each component UE of enhanced UE then applies modulation to the encoded data and applies joint precoding to modulated symbols before transmitting them. In this case, a joint precoding vector or other precoding information may be distributed to or otherwise known by the component UEs 1110, 1120 that are participating in the transmission by the enhanced UE.

In addition to the examples illustrated in FIG. 10 and FIG. 11, another embodiment could involve the SUE passing information bits (un-encoded) to each component UE and each component UE of the enhanced UE conducting encoding, modulation and precoding operations respectively.

It should be noted that an enhanced UE need not necessarily use a precoder exactly as provided by a network device. The final precoder or precoding vector that is used for precoding data for transmission may be enhanced UE implementation dependent. If the UL or DL channel is more static, with component UE locations and environment being more static for example, then a network device may report a precoder to the enhanced UE less often or at a slower rate.

Different embodiments for channel measurement and precoder generation are described at least above. Different options for applying precoding operations are also described. Such features may provide more effective joint precoding operations and potentially improve the performance of an enhanced UE.

Other aspects of the present disclosure relate to options for data transmission for an enhanced UE. From a network perspective, an enhanced UE is preferably treated as a single UE.

FIGS. 12A to 12E are block diagrams illustrating network-scheduled enhanced UE transmission. In the embodiment shown, the master UE of the enhanced UE collects a Scheduling Request (SR) from one or more SUEs of the enhanced UE 1204 and transmits an SR for the enhanced UE to a network device 1202, as shown at 1210 in FIG. 12A. Alternatively, one or more SUEs may send its own SR directly to the network device 1202.

The network device 1202 may schedule a data transmission for the enhanced UE and send a scheduling control signal to the enhanced UE 1204, as shown at 1220 in FIG. 12B. A component UE of the enhanced UE 1204, such as the master UE of the enhanced UE, may decode the scheduling control signal and pass signaling such as a scheduling message to other component UEs of the enhanced UE. In another embodiment, each SUE in the enhanced UE 1204 may receive and decode a scheduling control signal directly.

Each SUE passes data to other component UEs of the enhanced UE 1204, as shown at 1230 in FIG. 12C. The same data or different portions of data may be distributed to component UEs for transmission.

The enhanced UE 1204 transmits the data to the network device 1202 on one or more assigned resources, which may include time-frequency resources in some embodiments. As shown at 1240 in FIG. 12D, data transmission by the enhanced UE 1204 involves all of the component UEs transmitting data together to the network device 1202. This could mean that all of the component UEs are transmitting at the same time.

Figure 12D:
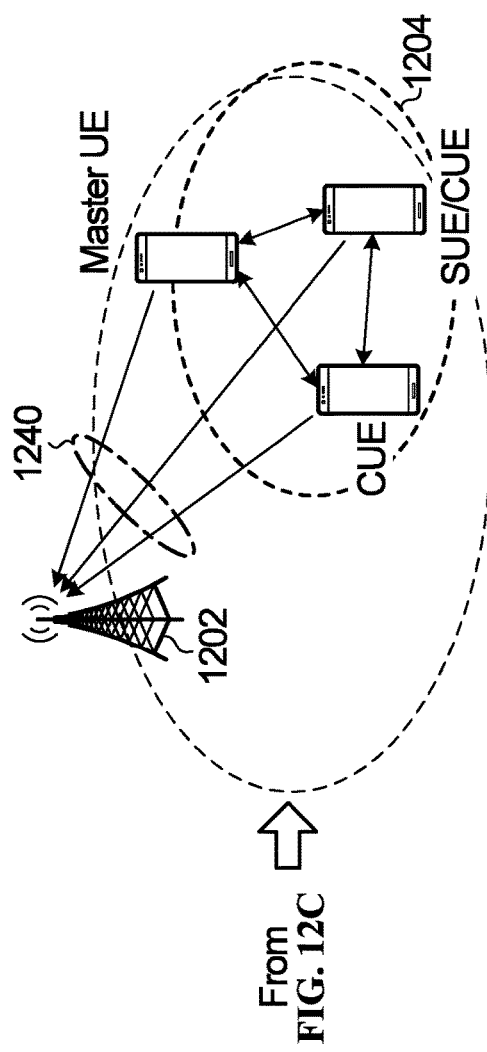
Figure 12E:
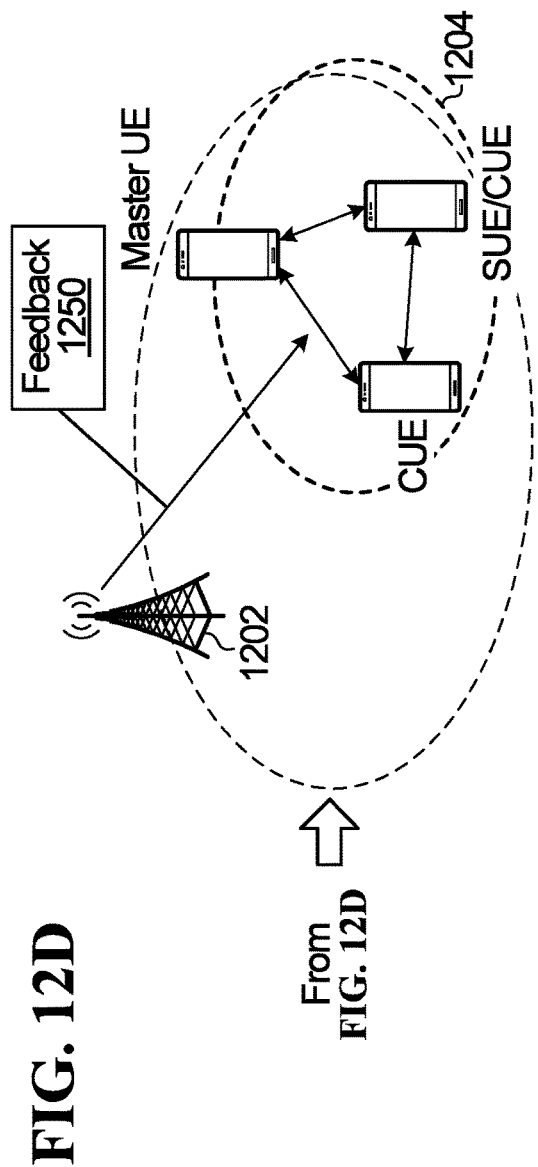

In some embodiments, the network device 1202 may send feedback such as Hybrid Automatic Repeat Request Acknowledgement/Negative Acknowledgement (HARQ ACK/NACK) signaling or scheduling of a new transmission or re-transmission to the enhanced UE 1204, as shown at 1250 in FIG. 12E.

FIGS. 13A to 13E are block diagrams illustrating enhanced UE initiation of transmission without network scheduling or grant. In the embodiment shown, an SUE of the enhanced UE 1304 sends a request to the master UE at 1310 in FIG. 13A to initiate a transmission. This operation could be omitted, for example, if the SUE is the master UE.

The master UE coordinates with all other component UEs within the enhanced UE 1304 for the transmission, which may involve coordinating features or parameters such as one or more resources and transmission timing for example. This is shown at 1320 in FIG. 13B.

At 1330 in FIG. 13C, the SUE passes the data that is to be transmitted to the other component UEs of the enhanced UE 1304.

The enhanced UE 1304 transmits the data to the network device 1302, on one or more pre-configured resources for example. As shown at 1340 in FIG. 13D, data transmission by the enhanced UE 1304 involves all of the component UEs transmitting data together to the network device 1302.

Figure 13D:
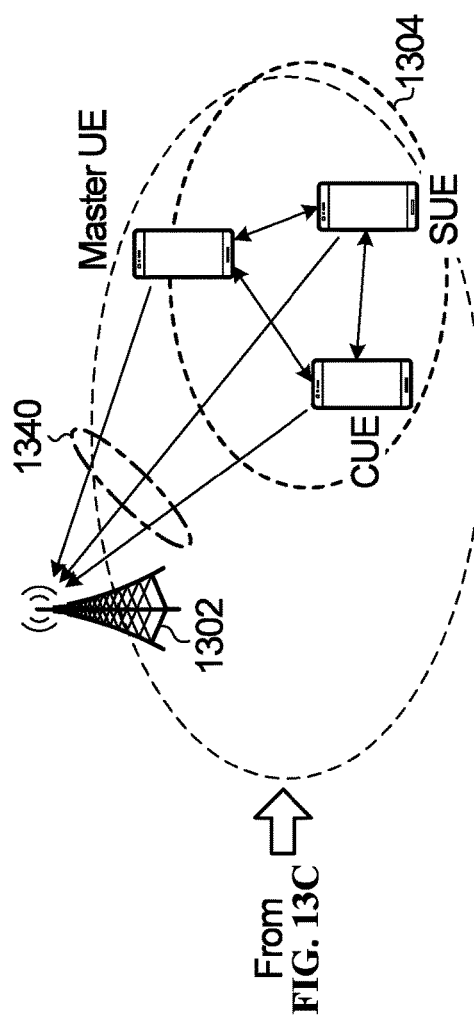
Figure 13E:
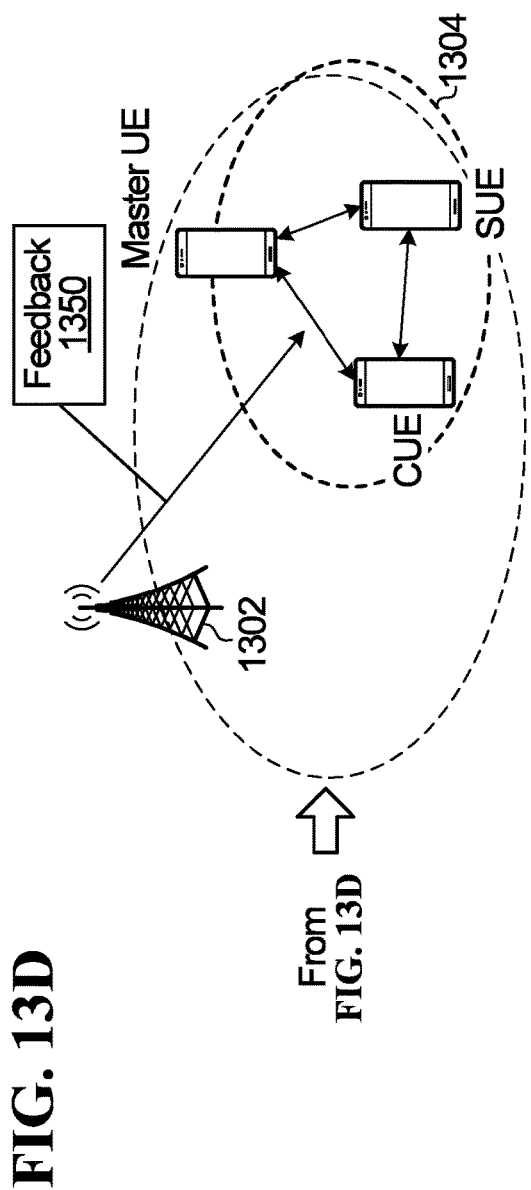

In some embodiments, the network device 1302 may send feedback such as HARQ ACK/NACK signaling to the enhanced UE 1304, as shown at 1350 in FIG. 13E. Although the initial transmission in this example is initiated by the enhanced UE 1304, a new transmission and/or a re-transmission may be scheduled by the network device 1302.

Other features may be provided in some embodiments. For example, DMRS signals may be used with data transmission and could be initiated or generated using an enhanced UE ID and/or one or more other parameters.

Data may be scrambled by an enhanced UE ID and/or one or more other parameters. Such scrambling of data may involve channel coding Cyclic Redundancy Check (CRC) mask scrambling and/or encoded bit-wise scrambling, for example.

Regarding a data transmission scheduling control signal in network-scheduled embodiments, a network device may send a data scheduling control signal to an enhanced UE as described at least above. The data scheduling control signal may be scrambled by an enhanced UE ID and/or one or more other parameters. For example, the data scheduling control signal may be scrambled at least by an enhanced UE RNTI in some embodiments. Such scrambling may include channel coding CRC mask scrambling and/or encoded bit-wise scrambling, for example.

A data scheduling control signal may be called downlink control information (DCI) and carried by physical downlink control channel (PDCCH). In some embodiments a data scheduling control signal may contain any one or more of the following: SUE ID, resource allocation (one or more of time, frequency, code), Modulation and coding scheme (MCS), MIMO layers, HARQ ID, and Redundancy Version (RV). An example is shown below

```
{... ... ...
SUE #1 ID -> resource allocation, MCS, MIMO layers, HARQ ID, RV;
SUE #2 ID -> resource allocation, MCS, MIMO layers, HARQ ID, RV;
... ... ...
}
```

Optional HARQ ACK/NACK feedback signaling that may be used in some embodiments may contain such information as any one or more of: SUE ID, and ACK/NACK. An example is shown below

```
{... .
SUE#1 ID -> HARQ ID, ACK/NACK
SUE#2 ID -> HARQ ID, ACK/NACK
}
```

These features related to data transmission may provide flexibility for enhanced UEs, at least in terms of enabling scheduled or non-scheduled transmission and optional feedback for example.

Figure 14:
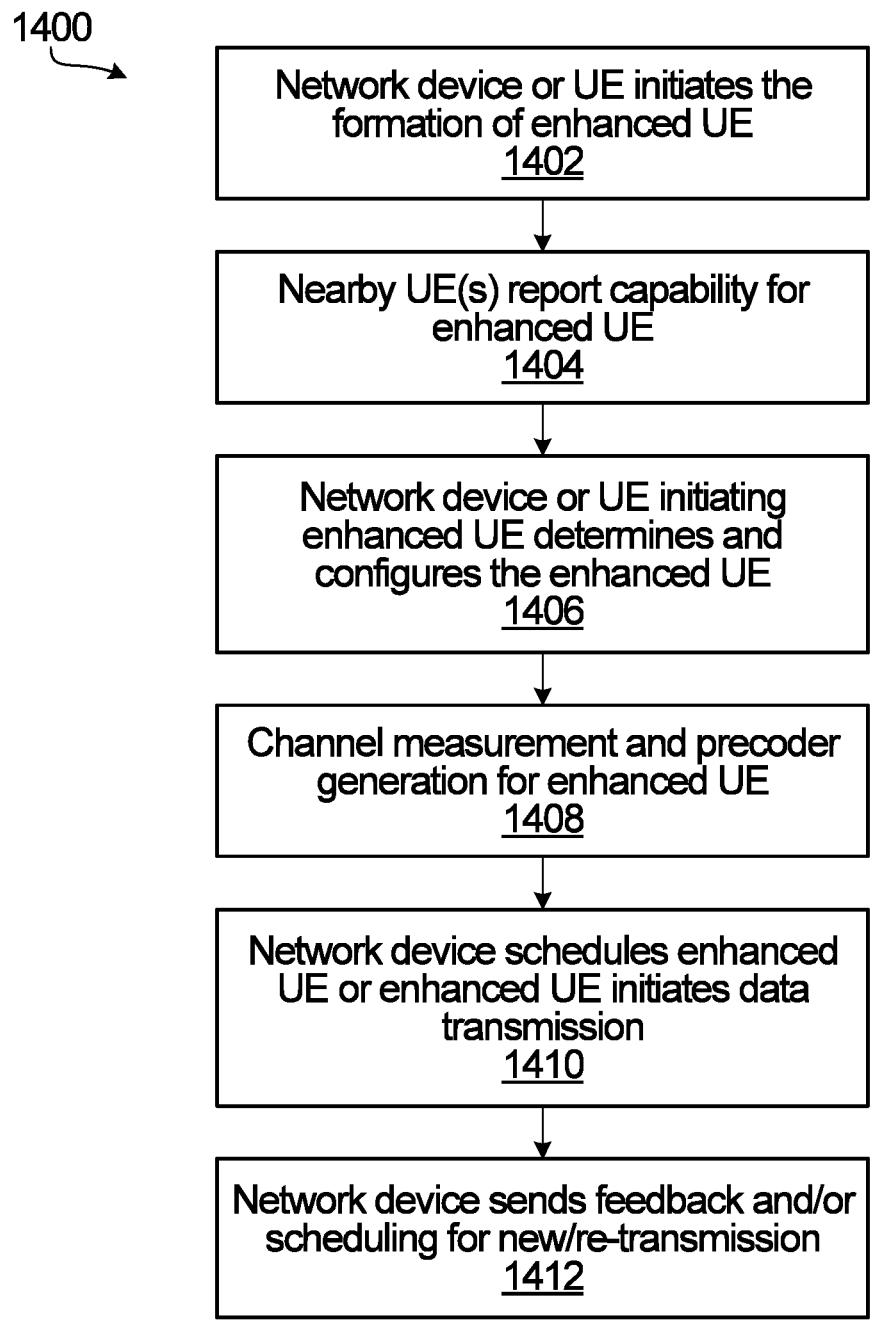
FIG. 14 is a flow diagram illustrating a method according to an embodiment.

FIG. 14 is a flow diagram illustrating a method according to an embodiment. The example method 1400 in FIG. 14 includes operations associated with enhanced UE formation and subsequent data transmission.

Formation of an enhanced UE is initiated, by a network device or a UE, at 1402. One or more nearby UE(s) report UE-specific capabilities at 1404, in response to a request for example. Capability reporting by a UE at 1404 may involve reporting capabilities to a network device or to another UE.

A determination as to whether the enhanced UE can be or should be formed is made at 1406, and a positive determination results in the enhanced UE being configured. A configuration for the enhanced UE may be signaled to a network device or to one or more component UEs. For example, a network device may transmit signaling indicative of an enhanced UE configuration to only a master UE, or to all component UEs.

Channel measurement and precoder generation for the enhanced UE are illustrated generally at 1408. Channel measurement may involve transmission of channel measurement signaling to a network device by the enhanced UE and reception of the channel measurement signaling by the network device, for example. Some embodiments may involve transmission of channel measurement signaling to the enhanced UE by a network device and reception of the channel measurement signaling by the enhanced UE. Precoder generation is by a receiver of channel measurement signaling, and is based on the received channel measurement signaling. Examples are shown in FIGS. 8A-8C and 9A-9C.

At 1410, FIG. 14 illustrates features related to data transmission, including network device scheduling of the enhanced UE or initiation of data transmission by the enhanced UE. Optional feedback and scheduling of a new transmission or a re-transmission by a network device are shown at 1412.

Figure 15:
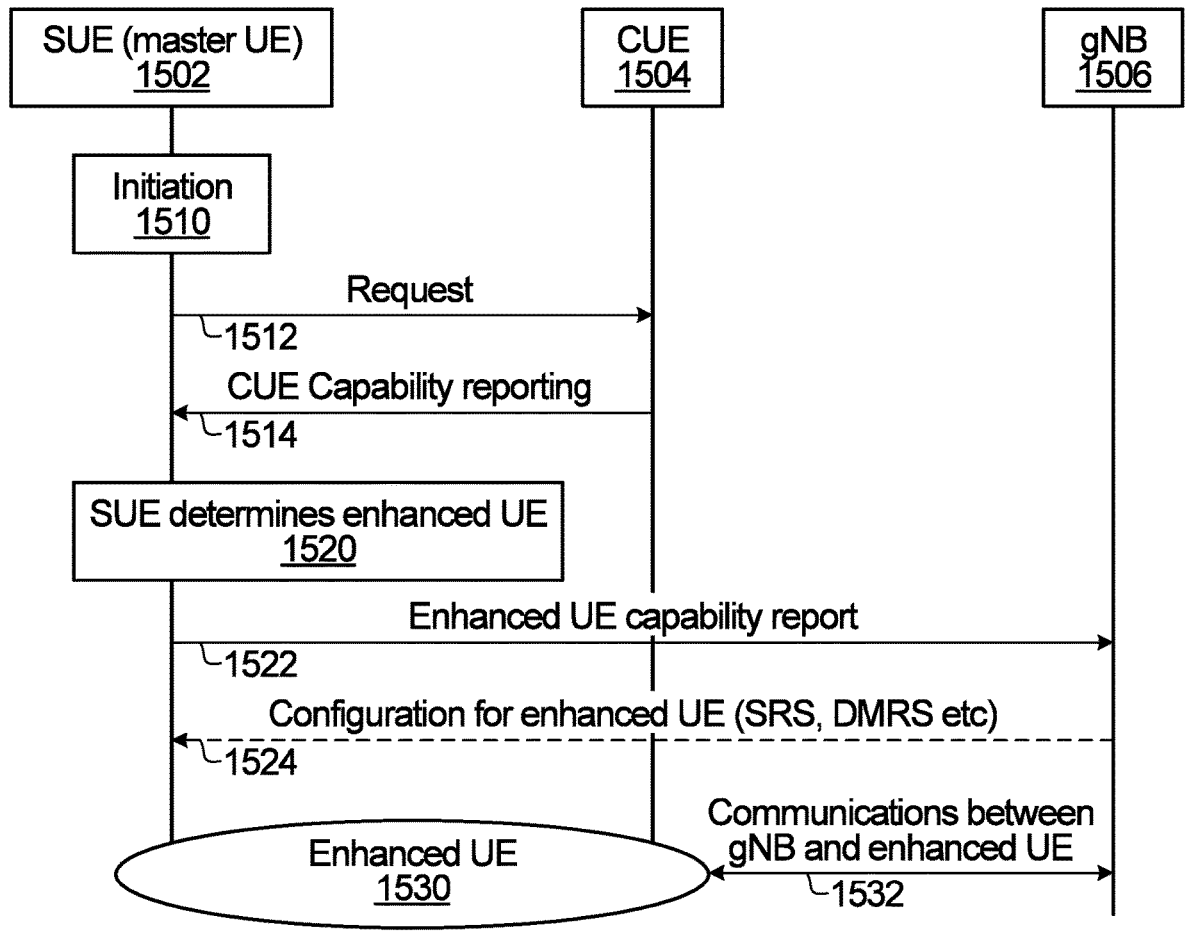
FIG. 15 is a signal flow diagram illustrating an example of enhanced UE formation initiated by a UE according to an embodiment.

FIG. 15 is a signal flow diagram illustrating an example of enhanced UE formation initiated by a UE according to an embodiment. The formation of an enhanced UE is initiated by an SUE 1502, as a master UE, at 1510 in the example shown. The SUE 1502 may request a capability report at 1512 from each CUE, one of which is shown at 1504, and each CUE may return a capability report to the SUE at 1514.

The SUE 1502 also determines at 1520 whether an enhanced UE is to be formed. In the example shown, the SUE 1502 makes a positive determination, and sends a capability report at 1522 to a network device, shown by way of example as a gNB 1506. The capability report at 1522 is indicative of enhanced UE capability, such as processing/transmit capability, including capabilities of the SUE 1502 and the CUE 1504. An example of optional transmission of a configuration from the gNB 1506 to the SUE 1502 is shown at 1524. Such a configuration could also or instead be transmitted from SUE at 1502 to CUE at 1504 The enhanced UE is shown at 1530, and communications between the gNB 1506 and the enhanced UE are shown at 1532.

Figure 16:
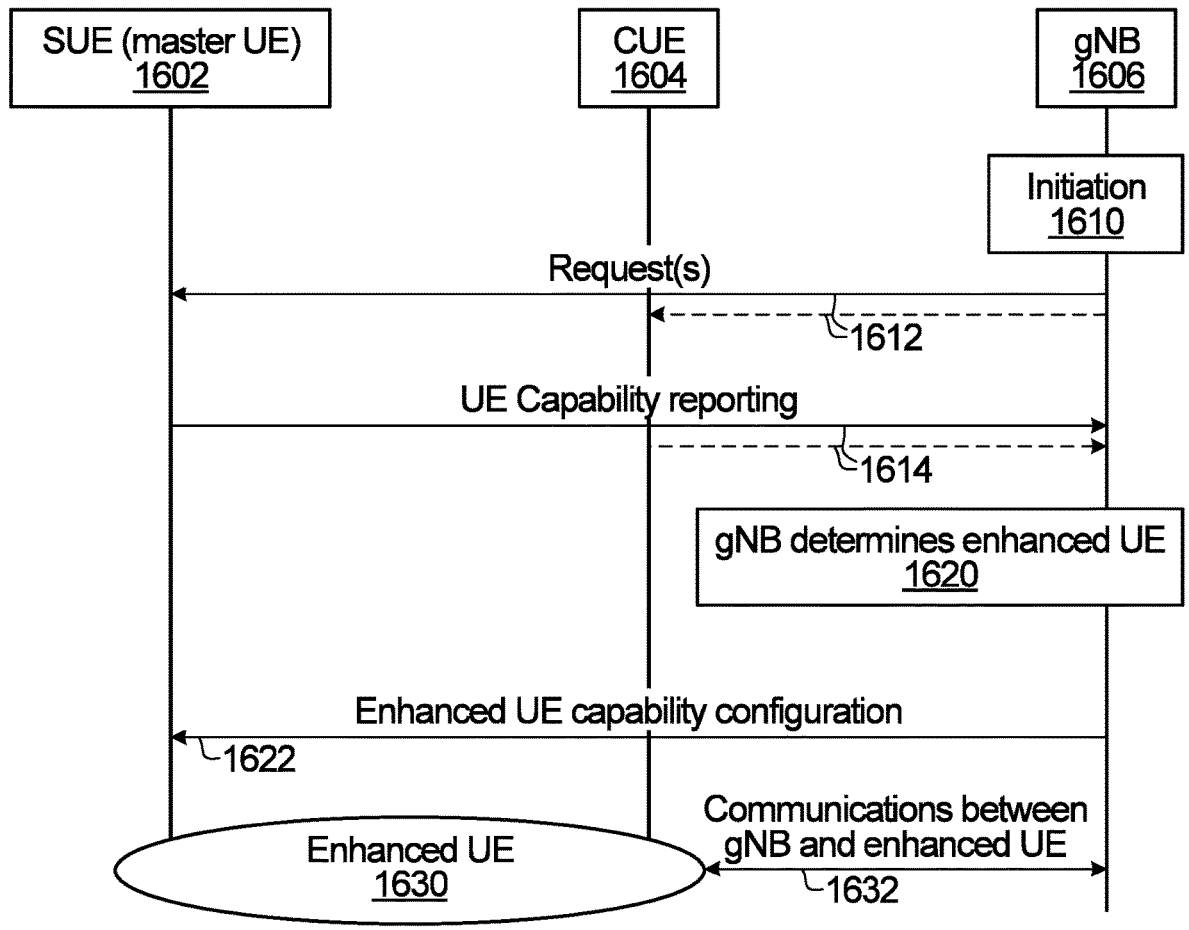
FIG. 16 is a signal flow diagram illustrating an example of network-initiated enhanced UE formation according to another embodiment.

FIG. 16 is a signal flow diagram illustrating an example of network-initiated enhanced UE formation according to another embodiment. In FIG. 16, the formation of an enhanced UE is initiated by a network device, shown by way of example as a gNB 1606. The gNB 1606 may request a capability report at 1612 from a master UE 1602 or from each UE including one or more CUEs, one of which is shown at 1604. One or more UE capability reports are returned to the gNB at 1614 in response to the request(s). The gNB 1606 determines at 1620 that an enhanced UE is to be formed, and sends a configuration to at least the master UE 1602 at 1622. The enhanced UE is shown at 1630, and communications between the gNB 1606 and the enhanced UE are shown at 1632.

Other features may also involve signaling between UEs and/or between one or more UEs and a network device. These include, for example, channel measurement and precoding generation, scheduling, and feedback.

FIGS. 14 to 16 are illustrative of operations that may be performed in various embodiments. The embodiments include, for example, methods that may be performed by a network device in a wireless communication network. Such a method may involve obtaining information that is indicative of a capability, or at least one capability, of an enhanced UE. As described herein, an enhanced UE is formed by multiple UEs in a wireless communication network to assist a UE with communications, and involves cooperation between the multiple UEs. The (at least one) capability of the enhanced UE is an enhanced capability relative to at least a capability of the UE that is to be assisted by the enhanced UE. Other component UEs of an enhanced UE may have different capabilities than the UE that is to be assisted.

Obtaining the information indicative of the (at least one) capability may involve receiving the information from the assisted UE or another one of the multiple UEs involved in the enhanced UE. For a network-initiated enhanced UE for example, a network device method may involve transmitting a request for the information to the UE or another one of the multiple UEs, as shown by way of example at 1612 in FIG. 16. The information indicative of the (at least one) capability is then transmitted to and received by the network device responsive to the request(s), as shown by way of example at 1614 in FIG. 16.

The enhanced UE involves respective capabilities of the multiple UEs for the enhanced UE. In some embodiments, obtaining the capability information indicative of the capability of the enhanced UE involves receiving UE-specific information indicative of the respective capabilities from the component UEs, and obtaining the information indicative of the (at least one) capability based on the UE-specific information received from each component UE. The network device may determine, from the received UE-specific information, how the enhanced UE is to be configured, and the enhanced UE capability relates to that configuration and a combination of the UE-specific capabilities that each component UE is contributing to the enhanced UE.

A request-response mechanism may be used for UE-specific information. A method involves transmitting a request for the UE-specific information to each component UE by a network device, or from one UE such as a master UE or an SUE/TUE, in some embodiments.

Regarding actual communications with the enhanced UE, communicating a signal with the enhanced UE in a manner consistent with the information indicative of the (at least one) capability may involve, for example, transmitting control signaling for scheduling the enhanced UE. Scheduling is shown generally at 1410 in FIG. 14, but not all embodiments involve scheduling. Communicating with an enhanced UE may involve receiving grant-free transmissions from the enhanced UE, for example. In general, communicating with an enhanced UE may involve any one or more of: transmitting control signaling to the enhanced UE, transmitting data to the enhanced UE, receiving control signaling from the enhanced UE, and receiving data from the enhanced UE.

Other features may also or instead be provided or supported in method embodiments. For example, the enhanced UE may have a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE. A network device method may involve transmitting the configuration for the enhanced UE to the assisted UE that the enhanced UE is to assist, and/or to another one or more of the multiple UEs.

In some embodiments, a network device method involves receiving channel measurement signaling from the enhanced UE. Channel measurement signaling may be transmitted to the network device by one, or more than one, of the component UEs. For example, channel measurement signaling could be transmitted to the network device by only an SUE if other component UEs are not contributing any additional antenna elements to the enhanced UE. Otherwise, multiple component UEs may transmit channel measurement signaling to the network device.

The network device may determine precoding information based on the channel measurement signaling, and therefore a network device method may also involve transmitting, to the enhanced UE, precoding information that was determined based on the channel measurement signaling. Precoding information may be transmitted to one UE, such as a master UE, and distributed by the master UE to any component UEs that are contributing antenna elements to the enhanced UE, for example. Precoding information may instead be transmitted by a network device to only an SUE or TUE, or to multiple component UEs.

Methods performed by a UE are also disclosed herein, and such a method may involve transmitting information indicative of a capability, or at least one capability, associated with an enhanced UE, and communicating a signal with a network device in the wireless communication network in a manner consistent with the information, after transmitting the information. The enhanced UE is formed by multiple UEs, including the UE that is performing such a method, to assist an assisted UE of the multiple UEs with communications. The enhanced UE involves cooperation between the multiple UEs, and has an enhanced capability relative to a capability of at least the assisted UE that the enhanced UE is to assist.

Such a method may involve receiving a request for the information, in which case the transmitting involves transmitting the information responsive to the request. Receiving a request may involve, for example, receiving the request from the network device, from the assisted UE that the enhanced UE is to assist, or from another UE of the multiple UEs involved in the enhanced UE. A request from a network device is shown by way of example at 1612 in FIG. 16, and in an embodiment a request from a UE is from a master UE as shown by way of example at 1512 in FIG. 15.

The enhanced UE involves respective capabilities of the multiple UEs for the enhanced UE. The information transmitted by a UE, such as a master UE for example, may be indicative of the enhanced capability of the enhanced UE based on the respective capabilities of the multiple UEs for the enhanced UE. The enhanced UE capability report at 1522 in FIG. 15 is an example of such information indicative of the enhanced capability of the enhanced UE.

A UE may also or instead transmit information that is indicative of a UE-specific capability of the UE for the enhanced UE, as shown by way of example at 1614 in FIG. 16.

In some embodiments, a UE method involves a UE receiving, from each other component UE of the multiple UEs, UE-specific information indicative of the respective capabilities of each other UE for the enhanced UE, and obtaining the information indicative of the enhanced capability of the enhanced UE based on the UE-specific information received from each other UE. This is shown by way of example at 1514 and 1520 in FIG. 15, in which the SUE 1502 as a master UE collects capability reports from the CUE 1504 and makes an enhanced UE determination at 1520.

As noted at least above, the enhanced UE may have a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE. In some embodiments, a UE method involves receiving the configuration for the enhanced UE, such as from the network device, from the UE that the enhanced UE is to assist, or from another UE of the multiple UEs.

In some embodiments, a UE method involves transmitting channel measurement signaling to the network device, and receiving precoding information that was determined based on the channel measurement signaling. The precoding information may be received from a network device or from another UE such as a master UE for example, and may have been determined by the network device or by the other UE.

A UE method may also or instead involve receiving channel measurement signaling from the network device, in which case communicating with the network device may involve applying precoding that was determined based on the channel measurement signaling.

Precoding information may be generated by a UE such as a master UE. In some embodiments, a UE method may involve receiving channel measurement signaling from the network device; receiving, from each other UE of the multiple UEs, signaling indicative of results of channel measurements by each other UE; and transmitting, to each other UE, precoding information that was determined based on the channel measurement signaling and the received signaling indicative of results of channel measurements by each other UE. An example of this is shown in FIGS. 9A to 9C. Communicating with the network device in such embodiments involves applying precoding that was determined based on the channel measurement signaling and the received signaling indicative of results of channel measurements by each other UE.

Considering this type of UE-based precoder generation but from the perspective of a UE that does not handle precoder generation, a method may involve receiving channel measurement signaling from the network device; transmitting, to another UE of the multiple UEs, signaling indicative of results of channel measurements by the UE based on the received channel measurement signaling; and receiving, from the other UE, signaling indicative of precoding that was determined based on the results of channel measurements by the UE based on the received channel measurement signaling. Communicating with the network device then involves applying the precoding.

Some embodiments involve scheduling of an enhanced UE, and therefore a UE method may involve receiving control signaling associated with scheduling of the enhanced UE by the network device, in which case the communicating may further involve communicating with the network device based on the scheduling. In other embodiments, the communicating involves grant-free transmission to the network device. In general, the communicating may involve any one or more of: transmitting control signaling, transmitting data, receiving control signaling, and receiving data.

Embodiments are described above primarily in the context of example methods. Other embodiments are also possible.

Figure 17A:
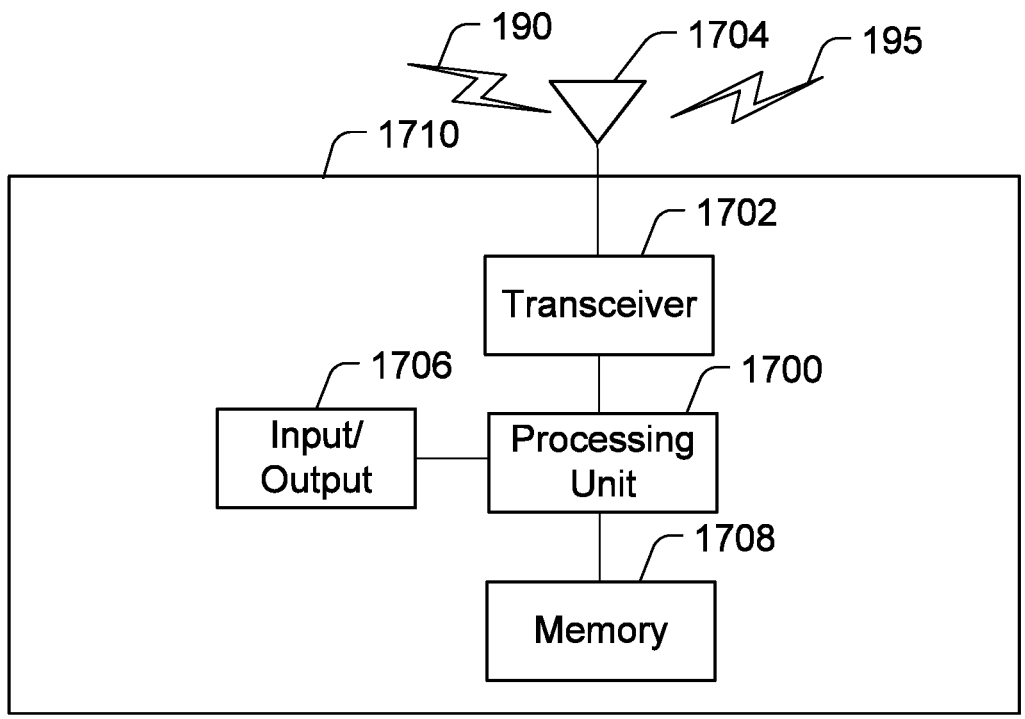
FIGS. 17A and 17B are block diagrams illustrating example devices that may implement the methods and teachings according to this disclosure.
Figure 17B:
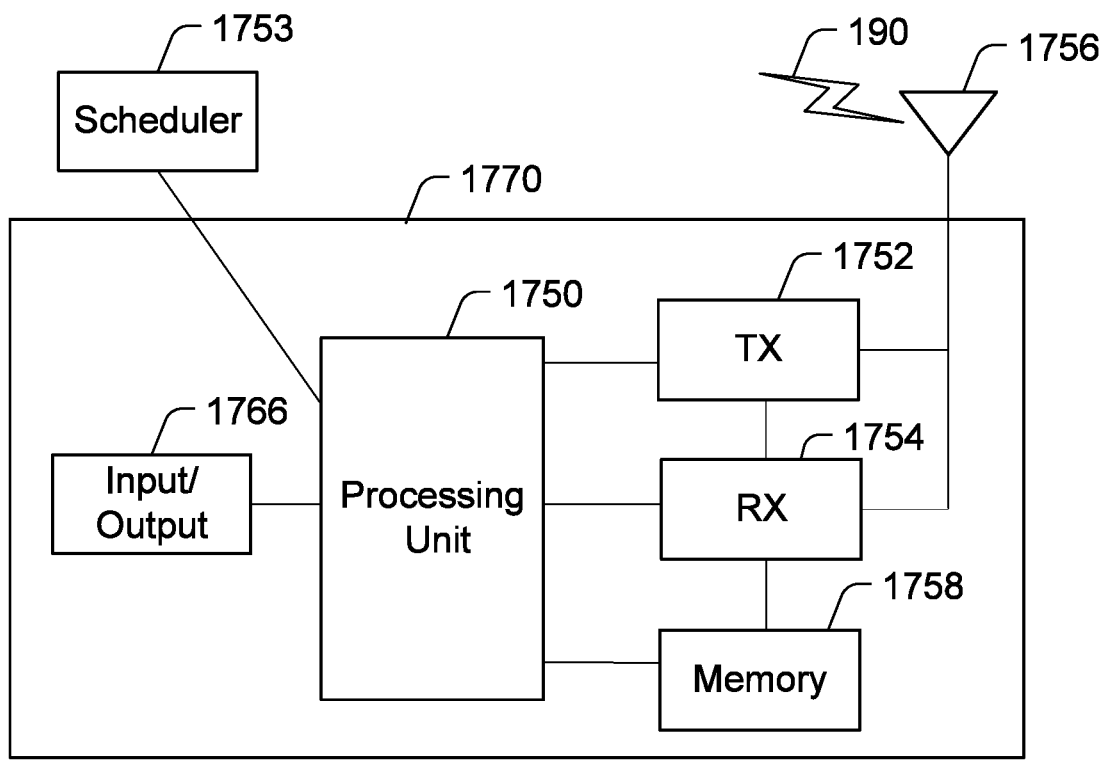

See, for example, FIGS. 17A and 17B which illustrate example devices that may implement the methods and teachings according to this disclosure.

FIG. 17A illustrates an example ED 1710, and FIG. 17B illustrates an example base station 1770. These components could be used in the system 100 (FIG. 1) or in any other suitable system.

As shown in FIG. 17A, the ED 1710 includes at least one processing unit 1700. The processing unit 1700 implements various processing operations of the ED 1710. For example, the processing unit 1700 could perform signal coding, data processing, power control, input processing, output processing, or any other functionality enabling the ED 1710 to operate in a communication system. The processing unit 1700 may also be configured to implement some or all of the functionality or embodiments described in more detail herein. Each processing unit 1700 includes any suitable processing or computing device configured to perform one or more operations. Each processing unit 1700 could, for example, include a microprocessor, microcontroller, digital signal processor, field programmable gate array, or application specific integrated circuit.

The ED 1710 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless transmission and/or processing signals received wirelessly or by wire. Each antenna 1704 includes any suitable structure for transmitting and/or receiving wireless signals. One or multiple transceivers 1702 could be used in the ED 1710, and one or multiple antennas 1704 could be used in the ED 1710. Although shown as a single functional unit, a transceiver 1702 could be implemented using at least one transmitter and at least one separate receiver.

The ED 1710 further includes one or more input/output devices 1706 or interfaces. The input/output devices 1706 facilitate interaction with a user or other devices (network communications) in the network. Each input/output device 1706 includes any suitable structure for providing information to or receiving/providing information from a user, such as a speaker, microphone, keypad, keyboard, display, or touch screen, including network interface communications.

In addition, the ED 1710 includes at least one memory 1708. The memory 1708 stores instructions and data used, generated, or collected by the ED 1710. For example, the memory 1708 could store software instructions or modules configured to implement some or all of the functionality or embodiments described above and that are executed by the processing unit(s) 1700. Each memory 1708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the base station 1770 includes at least one processing unit 1750, at least one transmitter 1752, at least one receiver 1754, one or more antennas 1756, at least one memory 1758, and one or more input/output devices or interfaces 1766. A transceiver, not shown, may be used instead of the transmitter 1752 and receiver 1754. A scheduler 1753 may be coupled to the processing unit 1750. The scheduler 1753 may be included within or operated separately from the base station 1770. The processing unit 1750 implements various processing operations of the base station 1770, such as signal coding, data processing, power control, input processing, output processing, or any other functionality. The processing unit 1750 can also be configured to implement some or all of the functionality or embodiments described in more detail herein. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transmitter 1752 includes any suitable structure for generating signals for wireless transmission to one or more EDs or other devices. Each receiver 1754 includes any suitable structure for processing signals received wirelessly or by wire from one or more EDs or other devices. Although shown as separate components, at least one transmitter 1752 and at least one receiver 1754 could be combined into a transceiver. Each antenna 1756 includes any suitable structure for transmitting, receiving, or both transmitting and receiving wireless signals. While a common antenna 1756 is shown here as being coupled to both the transmitter 1752 and the receiver 1754, one or more antennas 1756 could be coupled to the transmitter(s) 1752, and one or more separate antennas 1756 could be coupled to the receiver(s) 1754. Each memory 1758 includes any suitable volatile and/or non-volatile storage and retrieval device(s) such as those described above in connection to the ED 1710. The memory 1758 stores instructions and data used, generated, or collected by the base station 1770. For example, the memory 1758 could store software instructions or modules configured to implement some or all of the functionality or embodiments described herein and that are executed by the processing unit(s) 1750.

Each input/output device 1766 facilitates interaction with a user or other devices (network communications) in the network. Each input/output device 1766 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 1708 and the memory 1758, for example, could include one or more physical memory devices. Solid-state memory devices such as a Flash memory device could be implemented. Memory devices with movable or even removable storage media could also or instead be implemented.

FIG. 17A and FIG. 17B illustrate examples of a UE and a network device, respectively, in which embodiments could be implemented. More generally, an apparatus such as a UE or a network device may include a processor and a non-transitory computer readable storage medium, such as the processing unit 1700, 1750 and memory 1708, 1758 in FIG. 17A or FIG. 17B. Examples of UEs and network devices are provided elsewhere herein. Other components, such as a communication interface to which the processor is coupled, may also be provided. Elements 1702, 1704, 1752, 1754, 1756 in FIGS. 17A and 17B are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the apparatus is a UE that includes a communication interface, a processor coupled to the communication interface, and such a non-transitory computer readable storage medium coupled to the processor. A processor and a medium are shown by way of example as the processing unit 1700 and memory 1708 in FIG. 17A, and a communication interface may include such elements as the transceiver 1702 and/or one or more antennas 1704. In an embodiment, the programming includes instructions to perform, or to cause a processor in the UE to perform, a method that involves transmitting information indicative of a capability, or at least one capability, associated with an enhanced UE, and communicating a signal with a network device after transmitting the information. The enhanced UE is formed by multiple UEs in a wireless communication network, including the UE, to assist an assisted UE of the multiple UEs with communications; involves cooperation between the multiple UEs; and has an enhanced capability relative to a capability of the assisted UE that the enhanced UE is to assist.

Some embodiments include any one or more of the following features, in any of various combinations:
- the programming further includes instructions to perform, or to cause a processor in the UE to perform, receiving a request for the information;
- the transmitting involves transmitting the information responsive to the request;
- the receiving involves receiving the request from the network device, from the assisted UE that the enhanced UE is to assist, or from another UE of the multiple UEs;
- the enhanced UE involves respective capabilities of the multiple UEs for the enhanced UE;
- the information is indicative of the enhanced capability of the enhanced UE based on the respective capabilities of the multiple UEs for the enhanced UE;
- the information is indicative of a UE-specific capability of the UE for the enhanced UE;
- the programming further includes instructions to perform, or to cause a processor in the UE to perform: receiving, from each other UE of the multiple UEs, UE-specific information indicative of the respective capabilities of each other UE for the enhanced UE;
- the programming further includes instructions to perform, or to cause a processor in the UE to perform, obtaining the information indicative of the enhanced capability of the enhanced UE based on the UE-specific information received from each other UE;
- the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE;
- the programming further includes instructions to perform, or to cause a processor in the UE to perform, receiving the configuration for the enhanced UE;
- the receiving involves receiving the configuration from the network device, from the assisted UE that the enhanced UE is to assist, or from another UE of the multiple UEs;
- the programming further includes instructions to perform, or to cause a processor in the UE to perform, transmitting channel measurement signaling to the network device;
- the programming further includes instructions to perform, or to cause a processor in the UE to perform, receiving precoding information that was determined based on the channel measurement signaling;
- the programming further includes instructions to perform, or to cause a processor in the UE to perform, receiving channel measurement signaling from the network device;
- the communicating involves applying precoding that was determined based on the channel measurement signaling;
- the programming further includes instructions to perform, or to cause a processor in the UE to perform, receiving channel measurement signaling from the network device;
- the programming further includes instructions to perform, or to cause a processor in the UE to perform: receiving, from each other UE of the multiple UEs, signaling indicative of results of channel measurements by each other UE;
- the programming further includes instructions to perform, or to cause a processor in the UE to perform: transmitting, to each other UE, precoding information that was determined based on the channel measurement signaling and the received signaling indicative of results of channel measurements by each other UE;
- the communicating involves applying precoding that was determined based on the channel measurement signaling and the received signaling indicative of results of channel measurements by each other UE;
- the programming further includes instructions to perform, or to cause a processor in the UE to perform, receiving channel measurement signaling from the network device;
- the programming further includes instructions to perform, or to cause a processor in the UE to perform: transmitting, to another UE of the multiple UEs, signaling indicative of results of channel measurements by the UE based on the received channel measurement signaling;
- the programming further includes instructions to perform, or to cause a processor in the UE to perform: receiving, from the other UE, signaling indicative of precoding that was determined based on the results of channel measurements by the UE based on the received channel measurement signaling;
- the communicating involves applying the precoding;
- the programming further includes instructions to perform, or to cause a processor in the UE to perform, receiving control signaling associated with scheduling of the enhanced UE by the network device;
- the communicating further involves communicating with the network device based on the scheduling;
- the communicating involves any one or more of: transmitting control signaling, transmitting data, receiving control signaling, and receiving data;
- the communicating involves grant-free transmission to the network device.

Other features that could be implemented in UE embodiments could be or become apparent, for example, from the method embodiments disclosed herein.

A network device such as a base station or other network equipment could include a communication interface, a processor coupled to the communication interface, and a non-transitory computer readable storage medium coupled to the processor. A processor and a medium are shown by way of example as the processing unit 1750 and memory 1758 in FIG. 17B, and a communication interface may include such elements as the transmitter 1752, the receiver 1754, and/or one or more antennas 1756. In an embodiment, the storage medium stores programming for execution by the processor, and the programming could include instructions to perform, or to cause a processor in the UE to perform, a method that involves obtaining information indicative of a capability, or at least one capability, of an enhanced UE, and communicating a signal with the enhanced UE after obtaining the information. The enhanced UE is formed by multiple UEs in the wireless communication network to assist a UE of the multiple UEs with communications and involves cooperation between the multiple UEs. The (at least one) capability of the enhanced UE is or includes an enhanced capability relative to a capability of the UE that the enhanced UE is to assist.

Network device embodiments include embodiments with any one or more of the following features, in any of various combinations:
- the obtaining involves receiving the information from the UE or another one of the multiple UEs;
- the obtaining further involves transmitting a request for the information to the UE or another one of the multiple UEs;
- the enhanced UE involves respective capabilities of the multiple UEs for the enhanced UE;
- the obtaining involves receiving, from the UE or another one of the multiple UEs, UE-specific information indicative of the respective capabilities of the multiple UEs for the enhanced UE;
- the obtaining involves obtaining the information indicative of the capability of the enhanced UE based on the UE-specific information received from each UE of the multiple UEs;
- the obtaining further involves transmitting a request for the UE-specific information to the UE or another one of multiple UEs;
- the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE;
- the programming further includes instructions to perform, or to cause a processor in the UE to perform, transmitting the configuration for the enhanced UE to the UE or another one or more of the multiple UEs;
- the programming further includes instructions to perform, or to cause a processor in the UE to perform, receiving channel measurement signaling from the enhanced UE;
- the programming further includes instructions to perform, or to cause a processor in the UE to perform: transmitting, to the enhanced UE, precoding information that was determined based on the channel measurement signaling;
- the communicating involves transmitting control signaling for scheduling the enhanced UE;
- the communicating involves any one or more of: transmitting control signaling to the enhanced UE, transmitting data to the enhanced UE, receiving control signaling from the enhanced UE, and receiving data from the enhanced UE;
- the communicating involves receiving grant-free transmissions from the enhanced UE.

Other features that could be implemented in network device embodiments could be or become apparent, for example, from the method embodiments disclosed herein.

Figure 18:
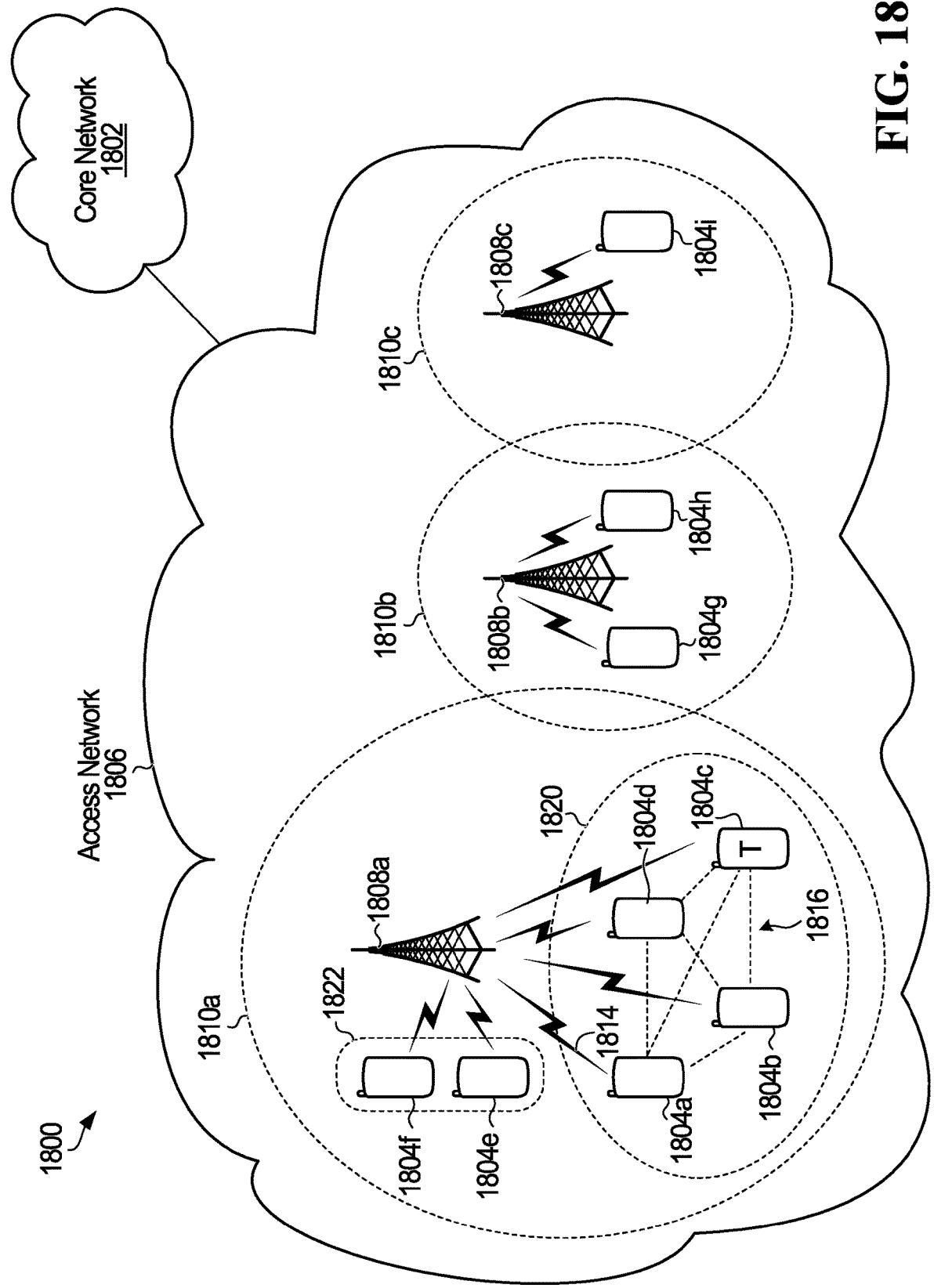
FIG. 18 is a block diagram illustrating an example of a telecommunications network according to one embodiment.

FIG. 18 is a block diagram illustrating an example of a telecommunications network 1800 according to one embodiment. The telecommunications network 1800 includes a core network 1802 and an access network 1806. The access network 1806 serves a plurality of UEs 1804*a*, 1804*b*, 1804*c*, 1804*d*, 1804*e*, 1804*f*, 1804*g*, 1804*h*, and 1804*i*. The access network 1806 is an Evolved Universal Terrestrial Access (E-UTRA) network in some embodiments. Another example of an access network 1806 is a cloud access network (C-RAN). The access network 1806 includes a plurality of BSs 1808*a*, 1808*b*, and 1808*c*. The BSs 1808*a-c* each provide a respective wireless coverage area 1810*a*, 1810*b*, and 1810*c*, also referred to as a cell. Each of the BSs 1808*a-c* could be implemented using a radio transceiver, one or more antennas, and associated processing circuitry, such as antenna radio frequency (RF) circuitry, one or more analog-to-digital converters, one or more digital-to-analog converters, etc.

Although not illustrated, the BSs 1808*a-c* are each connected to the core network 1802, either directly or through one or more central processing hubs, such as servers. The BSs 1808*a-c* could serve as a gateway between the wireline and wireless portion of the access network 1806.

Each one of BSs 1808*a-c* may instead be referred to as a base transceiver station, a radio BS, a network node, a transmit node, a transmit point, a Node B, an eNode B, a remote radio head (RRH), or otherwise, depending upon the implementation.

In operation, the plurality of UEs 1804*a-i* access the telecommunications network 1800 using the access network 1806 by wirelessly communicating with one or more of the BSs 1808*a-c*.

UEs 1804*a-d* are in close proximity to each other. Although the UEs 1804*a-d* can each wirelessly communicate with the BS 1808*a*, they can also directly communicate with each other, as represented at 1816. The communications represented at 1816 are direct communications between UEs, such as sidelink communications as disclosed herein, that do not go through an access network component, such as a BS. As shown in FIG. 18, UE to UE communications 1816 are directly between the UEs 1804*a-d* and are not routed through the BS 1808*a*, or any other part of the access network 1806. Communications 1816 may also be referred to as lateral communications. In embodiments disclosed herein, UE to UE communications use a sidelink channel and a sidelink air interface. On the other hand, a communication between an access network component, such as BS 1808*a*, and a UE, as in communication 1814, is called an access communication. An access communication occurs over an access channel, which can be a uplink or downlink channel, and an access communication uses a radio access communication interface, such as a cellular radio access air interface. Access and sidelink air interfaces may use different transmission formats, such as different waveforms, different multiple access schemes, or different radio access technologies. Some examples of radio access technologies that could be used by an access air interface or a sidelink air interface are: Long Term Evolution (LTE), LTE License Assisted Access (LTE-LAA), and WiFi.

By using the sidelink communications 1816, the UEs 1804*a-d* may be able to assist with wireless communications between the UEs 1804*a-d* and the BS 1808*a*. As one example, if UE 1804*c* fails to correctly decode a packet received from the BS 1808*a* but UE 1804*d* is able to receive and correctly decode the packet from the BS 1808*a*, then UE 1804*d* could directly transmit the decoded packet to UE 1804*c* using sidelink communications 1816. As another example, if UE 1804*c* moves out of wireless coverage area 1818*c*, such that UE 1804*c* can no longer wirelessly communicate with the BS 1808*a*, then UE 1804*b* could forward messages between the UE 1804*c* and the BS 1808*a*. As another example, UE 1804*a* and UE 1804*c* could both receive a signal transmitted from the BS 1808*a* that carries a packet meant for UE 1804*c*. UE 1804*a* may then transmit to UE 1804*c*, via sidelink communications 1816, the signal as received by UE 1804*a*. UE 1804*c* may then use the information received from UE 1804*a* to help decode the packet from the BS 1808*a*. In these examples, capacity or coverage may be improved by forming an enhanced UE to assist one or more of the UEs 1804a, 1804b, and 1804d.

The UEs 1804a-d form a UE group 1820 in some embodiments. It should be noted, however, that features as disclosed herein are not dependent upon UE groups being explicitly formed in advance.

In UE group 1820 and a scenario in which the UE 1804c is to be assisted, the other UEs 1804a, 1804b, and 1804d form a cooperation candidate set for assisting the UE 1804c. If UEs 1804a and 1804b assist the UE 1804c, then the UEs 1804a and 1804b form the cooperation active set. As UEs 1804a-d move around, some may leave the UE group 1820. UE movement may also or instead result in other UEs joining the UE group 1820. Therefore, the cooperation candidate set may change over time. For example, the cooperation candidate set may change semi-statically. The UE group 1820 may also be terminated by the network 1806, for example, if the network determines that there is no longer a need or opportunity for the UE group 1820 to provide assistance in wireless communication between the BS 1808a and members of the UE group 1820.

There may be more than one UE group. For example, UEs 1804e and 1804f in FIG. 18 form another UE group 1822.

Figure 19:
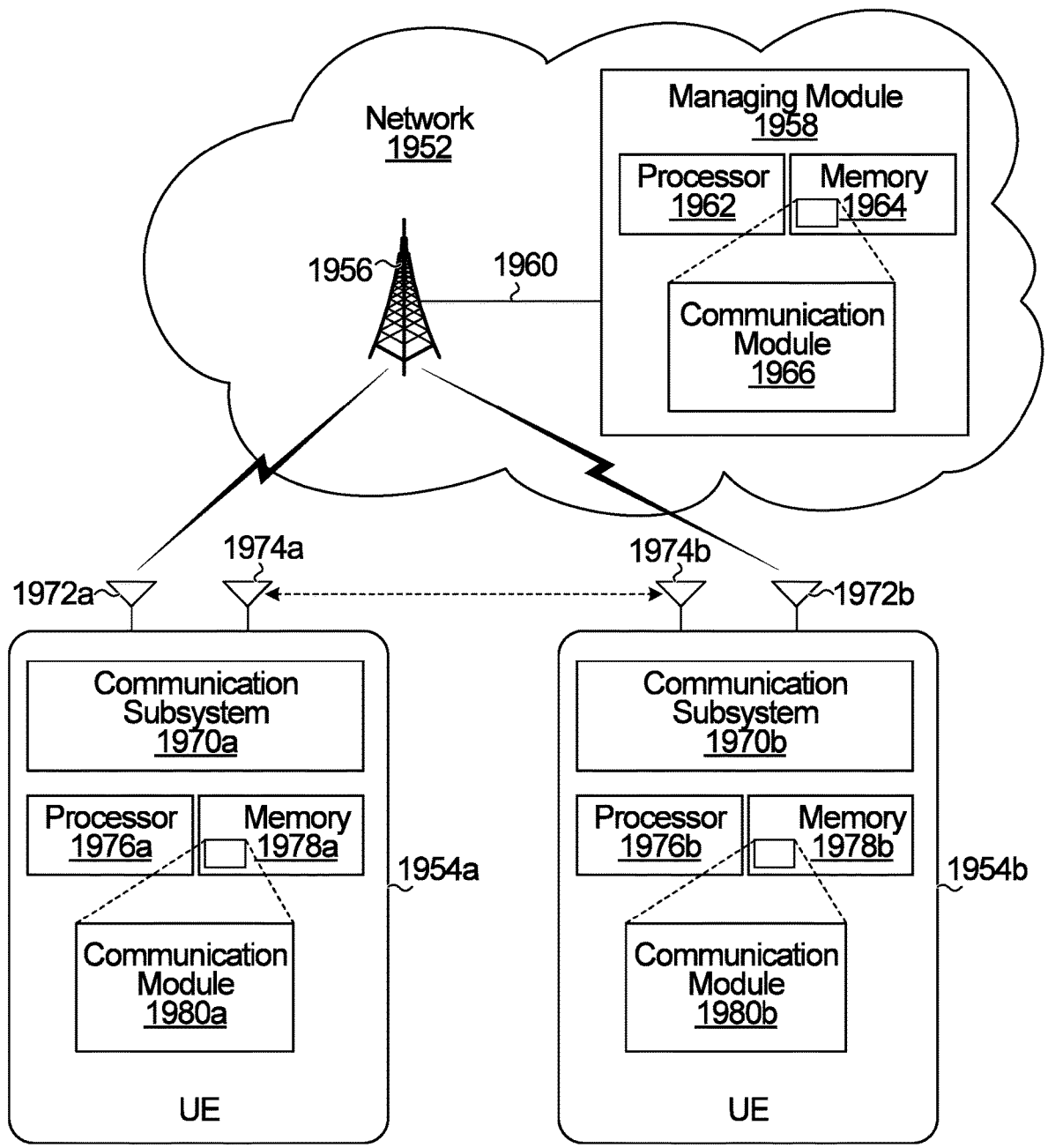
FIG. 19 is a block diagram illustrating an example of a network serving two UEs.

FIG. 19 is a block diagram illustrating an example of a network 1952 serving two UEs 1954a and 1954b, according to one embodiment. The network 1952 may be the access network 1806 from FIG. 18, and the two UEs 1954a and 1954b may be two of the four UEs 1804a-d in FIG. 18, or the UEs 1954a and 1954b may be UEs 1804e and 1804f in FIG. 18. However, more generally this need not be the case, which is why different reference numerals are used in FIG. 19.

The network 1952 includes a BS 1956 and a managing module 1958. The managing module 1958 instructs the BS 1956 to perform actions. The managing module 1958 is illustrated as physically separate from the BS 1956 and coupled to the BS 1956 via a communication link 1960. For example, the managing module 1958 may be part of a server in the network 1952. Alternatively, the managing module 1958 may be part of the BS 1956.

The managing module 1958 includes a processor 1962, a memory 1964, and a communication module 1966. The communication module 1966 is implemented by the processor 1962 when the processor 1962 accesses and executes a series of instructions stored in the memory 1964, the instructions defining the actions of the communication module 1966. When the instructions are executed, the communication module 1966 causes the BS 1956 to perform the actions described herein so that the network 1952 can establish, coordinate, instruct, or control UE cooperation and enhanced UE formation and operation. Alternatively, the communication module 1966 may be implemented using dedicated circuitry, such as an application specific integrated circuit (ASIC) or a programmed field programmable gate array (FPGA).

The UE 1954a includes a communication subsystem 1970a, two antennas 1972a and 1974a, a processor 1976a, and a memory 1978a. The UE 1954a also includes a communication module 1980a. The communication module 1980a is implemented by the processor 1976a when the processor 1976a accesses and executes a series of instructions stored in the memory 1978a, the instructions defining the actions of the communication module 1980a. When the instructions are executed, the communication module 1980a causes the UE 1954a to perform actions described herein in relation to UE cooperation. Alternatively, the module 1980a may be implemented by dedicated circuitry, such as an ASIC or an FPGA.

The communication subsystem 1970a includes processing circuitry, transmit circuitry, and receive circuitry for sending messages from and receiving messages at the UE 1954a. Although one communication subsystem 1970a is illustrated, the communication subsystem 1970a may be multiple communication subsystems. Antenna 1972a transmits wireless communication signals to, and receives wireless communications signals from, the BS 1956. Antenna 1974a transmits sidelink communication signals to, and receives sidelink communication signals from, other UEs, including UE 1954b. In some implementations there may not be two separate antennas 1972a and 1974a. A single antenna may be used. Alternatively, there may be several antennas, but not separated into antennas dedicated only to sidelink communication and antennas dedicated only to communicating with the BS 1956.

SL communications could be over Wi-Fi, in which case the antenna 1974a may be a Wi-Fi antenna. Alternatively, the sidelink communications could be over Bluetooth™, in which case the antenna 1974a may be a Bluetooth™ antenna. Sidelink communications could also or instead be over licensed or unlicensed spectrum.

The UE 1954b includes the same components described above with respect to the UE 1954a. That is, UE 1954b includes communication subsystem 1970b, antennas 1972b and 1974b, processor 1976b, memory 1978b, and communication module 1980b.

FIGS. 18 and 19 illustrate systems in which embodiments could be implemented. In some embodiments, a UE includes a processor, such as 1976a, 1976b in FIG. 19, and a non-transitory computer readable storage medium, such as 1978a, 1978b in FIG. 19, storing programming for execution by the processor. A non-transitory computer readable storage medium could also or instead be provided separately, as a computer program product. Examples are provided elsewhere herein.

The present disclosure encompasses various embodiments. Some embodiments relate to procedures for enhanced UE formation. Initiation of enhanced UE formation may be from either a network device or a component UE such as an SUE, TUE, or master UE. UE capability reporting for an enhanced UE may include, for example, any one or more of: number of antennas, MIMO capability, SL capability, and any other examples disclosed herein. Determination as to whether an enhanced UE is to be formed may be made by a network device or a component UE such as a master UE. A configuration for an enhanced UE could include such information as any one or more of: enhanced UE ID, component UE ID and capability for each component UE, role of each component UE in terms of coordination and data transmission, role of each component UE in terms of data processing manners, and any other examples disclosed herein. Roles of component UEs within an enhanced UE may include, for example, SUE, TUE, CUE, master UE, etc.

Disclosed embodiments also encompass options for channel measurement and precoding generation. For example, channel measurement and precoding generation may be accomplished at a network device over SRS signaling transmitted by an enhanced UE. The SRS signaling may be scrambled by enhanced UE ID and transmitted over antenna ports from each component UE configured for the enhanced UE, for example. In such embodiments, precoders are then sent to the enhanced UE from the network device, which may involve transmitting to the master UE of the enhanced UE and distribution to component UEs in the enhanced UE by the master UE. In another embodiment, channel measurement and precoding generation are accomplished at the enhanced UE over CSI-RS signaling transmitted by a network device, based on channel reciprocity. The channel measurement may be accomplished at each component UE and collected by the master UE. The master UE then calculates precoders and distributes them to the other component UE(s).

Joint precoding can be applied in different ways for an enhanced UE. For example, one or more joint precoding operations may be applied at an SUE and modulated symbols are then passed to other component UEs in the enhanced UE for joint transmission by the other component UEs. Another option involves one or more joint precoding operation applied at each component UE.

Regarding data transmission, scheduled and grant-free embodiments are possible. A network device may schedule a data transmission for an enhanced UE. For example, a master UE may collect an SR from one or more component UEs and pass the collected SR(s) to a network device. The network device could then schedule the enhanced UE for transmission. The enhanced UE may itself initiate data transmission without grant, with the master UE receiving a transmission request from an SUE and coordinating data sharing and transmission from the SUE and one or more CUEs for example.

Control signaling for scheduling, feedback, or both, are also proposed.

Embodiments disclosed herein encompass, among others, the examples below.

An example 1 relates to a method performed by a network device in a wireless communication network, the method comprising: obtaining information indicative of at least one capability of an enhanced UE that is formed by multiple UEs in the wireless communication network to assist a UE of the multiple UEs with communications and that involves cooperation between the multiple UEs, the at least one capability of the enhanced UE comprising an enhanced capability relative to a capability of the UE; communicating a signal with the enhanced UE after obtaining the information.

An example 2 relates to the method of example 1, wherein the obtaining comprises: receiving the information indicative of the at least one capability from the UE or another one of the multiple UEs.

An example 3 relates to the method of example 2, wherein the obtaining further comprises: transmitting a request for the information indicative of the at least one capability to the UE or another one of the multiple UEs.

An example 4 relates to the method of example 1, wherein the enhanced UE involves respective capabilities of the multiple UEs for the enhanced UE, wherein the obtaining comprises: receiving, from the UE or another one of the multiple UEs, UE-specific information indicative of the respective capabilities of the multiple UEs for the enhanced UE; obtaining the information indicative of the at least one capability of the enhanced UE based on the UE-specific information.

An example 5 relates to the method of example 4, wherein the obtaining further comprises: transmitting a request for the UE-specific information to the UE or another one of multiple UEs.

An example 6 relates to the method of example 1, wherein the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE.

An example 7 relates to the method of example 6, further comprising: transmitting the configuration for the enhanced UE to the UE or another one of the multiple UEs.

An example 8 relates to the method of any one of examples 1 to 7, further comprising: receiving channel measurement signaling from the enhanced UE; transmitting, to the enhanced UE, precoding information that was determined based on the channel measurement signaling.

An example 9 relates to the method of any one of examples 1 to 8, wherein the communicating a signal comprises any one or more of: transmitting control signaling to the enhanced UE, transmitting data to the enhanced UE, receiving control signaling from the enhanced UE, receiving data from the enhanced UE; and receiving grant-free transmissions from the enhanced UE.

An example 10 relates to a method performed by a UE in a wireless communication network, the method comprising: transmitting information indicative of at least one capability associated with an enhanced UE that is formed by multiple UEs in the wireless communication network, including the UE, to assist an assisted UE of the multiple UEs with communications and that involves cooperation between the multiple UEs, the enhanced UE having an enhanced capability relative to a capability of the assisted UE; communicating a signal with a network device in the wireless communication network after transmitting the information.

An example 11 relates to the method of example 10, further comprising: receiving a request for the information, wherein the transmitting comprises transmitting the information responsive to the request.

An example 12 relates to the method of example 11, wherein the receiving comprises: receiving the request from the network device, from the assisted UE, or from another UE of the multiple UEs.

An example 13 relates to the method of any one of examples 10 to 12, wherein the enhanced UE involves respective capabilities of the multiple UEs for the enhanced UE, wherein the information is indicative of the enhanced capability of the enhanced UE based on the respective capabilities of the multiple UEs for the enhanced UE.

An example 14 relates to the method of any one of examples 10 to 12, wherein the information is indicative of a UE-specific capability of the UE for the enhanced UE.

An example 15 relates to the method of example 13, further comprising: receiving, from each other UE of the multiple UEs, UE-specific information indicative of the respective capabilities of each other UE for the enhanced UE; obtaining the information indicative of the enhanced capability of the enhanced UE based on the UE-specific information.

An example 16 relates to the method of example 10, wherein the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE.

An example 17 relates to the method of example 16, further comprising: receiving the configuration for the enhanced UE.

An example 18 relates to the method of example 17, wherein the receiving comprises: receiving the configuration from the network device, from the assisted UE, or from another UE of the multiple UEs.

An example 19 relates to the method of any one of examples 10 to 18, further comprising: transmitting channel measurement signaling to the network device; receiving precoding information that was determined based on the channel measurement signaling.

An example 20 relates to the method of any one of examples 10 to 18, further comprising: receiving channel measurement signaling from the network device, wherein the communicating comprises applying precoding that was determined based on the channel measurement signaling.

An example 21 relates to the method of any one of examples 10 to 18, further comprising: receiving channel measurement signaling from the network device; receiving, from each other UE of the multiple UEs, signaling indicative of results of channel measurements by each other UE; transmitting, to each other UE, precoding information that was determined based on the channel measurement signaling and the received signaling indicative of results of channel measurements by each other UE, wherein the communicating comprises applying precoding that was determined based on the channel measurement signaling and the received signaling indicative of results of channel measurements by each other UE.

An example 22 relates to the method of any one of examples 10 to 18, further comprising: receiving channel measurement signaling from the network device; transmitting, to another UE of the multiple UEs, signaling indicative of results of channel measurements by the UE based on the received channel measurement signaling; receiving, from the other UE, signaling indicative of precoding that was determined based on the results of channel measurements by the UE based on the received channel measurement signaling, wherein the communicating comprises applying the precoding.

An example 23 relates to the method of any one of examples 10 to 22, wherein the communicating comprises any one or more of: transmitting control signaling, transmitting data, receiving control signaling, receiving data, and grant-free transmission to the network device.

An example 24 relates to a computer program product comprising a non-transitory computer readable storage medium storing programming, the programming including instructions to perform the method of any one of examples 1 to 23.

An example 25 relates to a network device comprising: a communication interface; a processor, coupled to the communication interface; a non-transitory computer readable storage medium, coupled to the processor, storing programming for execution by the processor, the programming including instructions to perform the method of any one of examples 1 to 9.

An example 26 relates to a UE comprising: a communication interface; a processor, coupled to the communication interface; a non-transitory computer readable storage medium, coupled to the processor, storing programming for execution by the processor, the programming including instructions to perform the method of any one of examples 10 to 23.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
receiving, from one or more user equipment (UE) of multiple UEs in a wireless communication network, a report of a capability associated with an enhanced UE, wherein the enhanced UE is formed by the multiple UEs to assist an assisted UE of the multiple UEs with communications, the enhanced UE involves cooperation between the multiple UEs, and the enhanced UE has an enhanced capability relative to a capability of the assisted UE; and
communicating a signal with the enhanced UE after receiving the report.

2. The method of claim 1, wherein the enhanced UE involves respective capabilities of the multiple UEs for the enhanced UE, wherein the receiving comprises:
receiving the report from one of the multiple UEs, the report comprising a report of the respective capabilities of the multiple UEs for the enhanced UE; or
receiving, from each UE of the multiple UEs, a report of the respective capability of each UE for the enhanced UE.

3. The method of claim 1, wherein the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE.

4. The method of claim 1, further comprising:
receiving channel measurement signaling from the enhanced UE; and
transmitting, to the enhanced UE, precoding information that was determined based on the channel measurement signaling.

5. A method comprising:
transmitting, from a user equipment (UE) of multiple UEs in a wireless communication network, a report of a capability associated with an enhanced UE, wherein the enhanced UE is formed by the multiple UEs to assist an assisted UE of the multiple UEs with communications, the enhanced UE involves cooperation between the multiple UEs, and the enhanced UE has an enhanced capability relative to a capability of the assisted UE;
communicating a signal with a network device in the wireless communication network after transmitting the report.

6. The method of claim 5, wherein the enhanced UE involves respective capabilities of the multiple UEs for the enhanced UE, wherein the report is indicative of the enhanced capability of the enhanced UE based on the respective capabilities of the multiple UEs for the enhanced UE.

7. The method of claim 6, further comprising:
receiving, from each other UE of the multiple UEs, a report of the respective capability of each other UE for the enhanced UE; and
obtaining information indicative of the enhanced capability of the enhanced UE based on the report received from each other UE.

8. The method of claim 5, wherein the capability associated with the enhanced UE is a UE-specific capability of the UE that the UE contributes to the enhanced UE, wherein the UE-specific capability is different from the capability of the UE when the UE operates on its own.

9. The method of claim 5, wherein the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE.

10. The method of claim 5, further comprising:
transmitting channel measurement signaling to the network device; and
receiving precoding information that was determined based on the channel measurement signaling.

11. The method of claim 5, further comprising:
receiving channel measurement signaling from the network device,
wherein the communicating comprises applying precoding that was determined based on the channel measurement signaling.

12. A computer program product comprising a non-transitory computer readable storage medium storing programming, the programming including instructions to perform the method of claim 1.

13. A computer program product comprising a non-transitory computer readable storage medium storing programming, the programming including instructions to perform the method of claim 5.

14. An apparatus comprising:
a processor; and
a non-transitory computer readable storage medium, coupled to the processor, storing programming for execution by the processor, the programming including instructions to:
receive, from one or more user equipment (UE) of multiple UEs in a wireless communication network, a report of a capability associated with an enhanced UE, wherein the enhanced UE is formed by the multiple UEs to assist an assisted UE of the multiple UEs with communications, the enhanced UE involves cooperation between the multiple UEs, and the enhanced UE has an enhanced capability relative to a capability of the assisted UE; and
communicate a signal with the enhanced UE after receiving the report.

15. The apparatus of claim 14, wherein the enhanced UE involves respective capabilities of the multiple UEs for the enhanced UE, wherein the instruction to receive the report comprises instructions to:
receive the report one of the multiple UEs, the report comprising a report of the respective capabilities of the multiple UEs for the enhanced UE; or
receive, from each UE of the multiple UEs, a report of the respective capability of each UE for the enhanced UE.

16. The apparatus of claim 14, wherein the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced U E.

17. The apparatus of claim 14, further comprising instructions to:
receive channel measurement signaling from the enhanced UE; and transmit, to the enhanced UE, precoding information that was determined based on the channel measurement signaling.

18. An apparatus comprising:
a processor; and
a non-transitory computer readable storage medium, coupled to the processor, storing programming for execution by the processor, the programming including instructions to:
transmit, from a user equipment (UE) of multiple UEs in a wireless communication network, a report of a capability associated with an enhanced UE, wherein the enhanced UE is formed by the multiple UEs to assist an assisted UE of the multiple UEs with communications, the enhanced UE involves cooperation between the multiple UEs, and the enhanced UE has an enhanced capability relative to a capability of the assisted UE;
communicate a signal with a network device in the wireless communication network after transmitting the report.

19. The apparatus of claim 18, wherein the enhanced UE involves respective capabilities of the multiple UEs for the enhanced UE, wherein the report is indicative of the enhanced capability of the enhanced UE based on the respective capabilities of the multiple UEs for the enhanced UE.

20. The apparatus of claim 19, further comprising instructions to:
receive, from each other UE of the multiple UEs, a report of the respective capability of each other UE for the enhanced UE; and
obtain information indicative of the enhanced capability of the enhanced UE based on the report received from each other UE.

21. The apparatus of claim 18, wherein the capability associated with the enhanced UE is a UE-specific capability of the UE that the UE contributes to the enhanced UE.

22. The apparatus of claim 18, wherein the enhanced UE has a configuration indicative of any one or more of: an enhanced UE identifier, respective identifiers of the multiple UEs, respective UE-specific information indicative of the respective capabilities of the multiple UEs for the enhanced UE, and respective roles of the multiple UEs for the enhanced UE.

23. The apparatus of claim 18, further comprising instructions to:
transmit channel measurement signaling to the network device; and
receive precoding information that was determined based on the channel measurement signaling.

24. The apparatus of claim 18, further comprising instructions to:
receive channel measurement signaling from the network device,
wherein the instruction to communicate the signal comprises an instruction to apply precoding that was determined based on the channel measurement signaling.

25. The method of claim 1, wherein the enhanced UE has a configuration that includes respective Radio Network Temporary Identifiers (RNTIs) of the multiple UEs.

26. The method of claim 5, wherein the enhanced UE has a configuration that includes respective Radio Network Temporary Identifiers (RNTIs) of the multiple UEs.

27. The apparatus of claim 14, wherein the enhanced UE has a configuration that includes respective Radio Network Temporary Identifiers (RNTIs) of the multiple UEs.

28. The apparatus of claim 18, wherein the enhanced UE has a configuration that includes respective Radio Network Temporary Identifiers (RNTIs) of the multiple UEs.

* * * * *